(12) United States Patent
Gopal

(10) Patent No.: US 9,904,485 B2
(45) Date of Patent: Feb. 27, 2018

(54) SECURE MEMORY CONTROLLER

(71) Applicant: Intel Corporation, Santa Clara, CA (US)

(72) Inventor: Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/086,523

(22) Filed: Mar. 31, 2016

(65) Prior Publication Data
US 2017/0285986 A1    Oct. 5, 2017

(51) Int. Cl.
*G06F 12/00*    (2006.01)
*G06F 13/00*    (2006.01)
(Continued)

(52) U.S. Cl.
CPC .......... *G06F 3/0622* (2013.01); *G06F 3/0637* (2013.01); *G06F 3/0659* (2013.01); *G06F 3/0673* (2013.01)

(58) Field of Classification Search
CPC . G06F 3/00; G06F 3/06; G06F 3/0601; G06F 3/0602; G06F 3/062; G06F 3/0622; G06F 3/0623; G06F 3/0628; G06F 3/0629; G06F 3/0631; G06F 3/0632; G06F 3/0634; G06F 3/0635; G06F 3/0637; G06F 3/0646; G06F 3/0652; G06F 3/0653; G06F 3/0655; G06F 3/0656; G06F 3/0658; G06F 3/0659; G06F 3/0668; G06F 3/067; G06F 3/0671; G06F 3/0673; G06F 3/0674–3/0689; G06F 12/00; G06F 12/14–12/16; G06F 21/00;
(Continued)

(56) References Cited

U.S. PATENT DOCUMENTS 4,525,599 A * 6/1985 Curran ................ G06F 12/1408
                                                  273/460
5,640,582 A * 6/1997 Hays .................... G06F 9/3004
                                                  712/202

(Continued)

OTHER PUBLICATIONS

Algorithms in Java, Third Edition; Sedgewick, Robert; ISBN 0201361205; 2003; pp. 150-151 (2 pages)n.*
(Continued)

*Primary Examiner* — Daniel C Chappell
(74) *Attorney, Agent, or Firm* — Law Office of R. Alan Burnett, P.S.

(57) ABSTRACT

Methods and apparatus for a secure memory controller. The secure memory controller includes circuitry and logic that is programmed to prevent malicious code from overwrite protected regions of system memory. The memory controller observes memory access patterns and trains itself to identify thread stacks and addresses relating to the thread stacks including stack-frame pointers and return addresses. In one aspect, the memory controller prevents a return address from being overwritten until a proper return from a function call is detected. The memory controller is also configured to prevent malicious code from overwriting page table entries (PTEs) in page tables. Pages containing PTEs are identified, and access is prevented to the PTEs from user-mode code. The PTEs are also scanned to detect corrupted PTEs resulting from bit manipulation by malicious code.

23 Claims, 17 Drawing Sheets

(51) Int. Cl.
*G06F 13/28* (2006.01)
*G06F 3/06* (2006.01)

(58) Field of Classification Search
CPC ..... G06F 21/50–21/645; G06F 21/70–21/805;
G06F 2003/0691; G06F 2003/0692; G06F
2003/0694; G06F 2003/0695; G06F
2003/0697; G06F 2003/0698; G06F
2212/00–2212/7211; G06F
2221/00–2221/2153
See application file for complete search history.

(56) References Cited

U.S. PATENT DOCUMENTS

| | | | | | |
|---|---|---|---|---|---|
| 5,915,266 | A * | 6/1999 | Falik | | G06F 9/32 711/211 |
| 5,949,973 | A * | 9/1999 | Yarom | | G06F 9/4426 712/E9.083 |
| 5,950,221 | A * | 9/1999 | Draves | | G06F 9/5016 707/999.009 |
| 6,167,504 | A * | 12/2000 | Damron | | G06F 9/30105 711/204 |
| 6,202,176 | B1 * | 3/2001 | Baldischweiler | | G06F 9/4426 711/152 |
| 6,301,699 | B1 * | 10/2001 | Hollander | | G06F 21/55 717/131 |
| 6,412,071 | B1 * | 6/2002 | Hollander | | G06F 9/4425 711/E12.101 |
| 6,578,094 | B1 * | 6/2003 | Moudgill | | G06F 7/785 710/40 |
| 6,618,797 | B1 * | 9/2003 | Dery | | G06F 9/3834 711/132 |
| 7,058,768 | B2 * | 6/2006 | Willman | | G06F 12/145 711/154 |
| 7,337,291 | B2 * | 2/2008 | Abadi | | G06F 12/1458 711/100 |
| 7,581,103 | B2 * | 8/2009 | Home | | G06F 11/3624 713/176 |
| 7,650,640 | B1 * | 1/2010 | Levy | | G06F 21/52 726/23 |
| 7,853,803 | B2 * | 12/2010 | Milliken | | G06F 21/52 713/176 |
| 8,707,433 | B1 * | 4/2014 | Mann | | G06F 11/3003 726/22 |
| 8,990,546 | B2 * | 3/2015 | Wilson | | G06F 9/30054 712/242 |
| 9,245,110 | B2 * | 1/2016 | Deutschle | | G06F 21/52 |
| 9,251,373 | B2 * | 2/2016 | AlHarbi | | G06F 21/64 |
| 9,417,821 | B2 * | 8/2016 | Slaight | | G06F 12/0866 |
| 9,529,805 | B2 * | 12/2016 | Thadikaran | | G06F 17/30082 |
| 9,665,717 | B2 * | 5/2017 | Boehm | | G06F 21/566 |
| 2001/0013094 | A1 * | 8/2001 | Etoh | | G06F 9/4426 712/227 |
| 2003/0182572 | A1 * | 9/2003 | Cowan | | G06F 9/4426 726/22 |
| 2003/0200402 | A1 * | 10/2003 | Willman | | G06F 12/145 711/154 |
| 2003/0217277 | A1 * | 11/2003 | Narayanan | | G06F 21/52 713/187 |
| 2004/0143824 | A1 * | 7/2004 | Sarcar | | G06F 9/4425 717/145 |
| 2004/0250105 | A1 * | 12/2004 | Molnar | | G06F 21/52 726/23 |
| 2005/0257016 | A1 * | 11/2005 | Boles | | G06F 12/1491 711/163 |
| 2006/0149917 | A1 * | 7/2006 | O'Connor | | G06F 12/1441 711/173 |
| 2006/0225134 | A1 * | 10/2006 | Conti | | G06F 21/71 726/22 |
| 2006/0265605 | A1 * | 11/2006 | Ramezani | | G06F 21/79 713/193 |
| 2008/0059711 | A1 * | 3/2008 | McKeen | | G06F 12/0804 711/129 |
| 2008/0109903 | A1 * | 5/2008 | Werner | | G06F 12/1433 726/22 |
| 2008/0163359 | A1 * | 7/2008 | Conti | | G06F 12/1441 726/17 |
| 2008/0256327 | A1 * | 10/2008 | Jacobs | | G06F 9/4856 711/207 |
| 2009/0094702 | A1 * | 4/2009 | Yang | | G06F 21/34 726/34 |
| 2010/0293392 | A1 * | 11/2010 | Miyamoto | | G06F 12/1425 713/193 |
| 2010/0325389 | A1 * | 12/2010 | Moore | | G06F 15/17 712/30 |
| 2013/0013965 | A1 * | 1/2013 | Guillemin | | G06F 21/52 714/48 |
| 2013/0061328 | A1 * | 3/2013 | Mendel | | G06F 21/57 726/25 |
| 2013/0124917 | A1 * | 5/2013 | Das | | G06F 11/1479 714/6.12 |
| 2014/0173293 | A1 * | 6/2014 | Kaplan | | G06F 21/54 713/190 |
| 2014/0283088 | A1 * | 9/2014 | AlHarbi | | G06F 21/64 726/26 |
| 2015/0089246 | A1 * | 3/2015 | Kanai | | G06F 12/1491 713/193 |
| 2015/0150024 | A1 * | 5/2015 | Grossi | | G06F 9/30134 718/108 |
| 2015/0227414 | A1 * | 8/2015 | Varma | | G06F 11/073 714/47.1 |

OTHER PUBLICATIONS

StackGhost: Hardware Facilitated Stack Protection; Frantzen et al; Proceedings of the 10th USENIX Security Symposium; Aug. 13-17, 2001; pp. 55-66; retrieved from http://pages.cs.wisc.edu/~rist/642-fall-2014/stackghost.pdf on Jun. 7, 2017 (12 pages).*

Tilera—Tile64(TM) Processor; Filippo, Mondello; Jul. 7, 2008; retrieved from http://home.deib.polimi.it/silvano/FilePDF/ARC-MULTIMEDIA/Presentation_Tilera_Tile64.pdf on Jun. 10, 2017 (12 pages).*

Classification of Buffer Overflow Vulnerability Monitors; Shahriar et al; ARES '10 International Conference on Availability, Reliability, and Security; Feb. 15-18, 2010; pp. 519-524 (6 pages) (Year: 2010).*

Preventing Overflow Attacks by Memory Randomization; Iyer et al; IEEE 21st International Symposium on Software Reliability Engineering; Nov. 1-4, 2010; pp. 339-347 (9 pages) (Year: 2010).*

A processor architecture defense against buffer overflow attacks; McGregor et al; International Conference on Information Technology: Research and Education; Aug. 11-13, 2003; pp. 243-250 (8 pages) (Year: 2003).*

Dynamic code instrumentation to detect and recover from return address corruption; Gupta et al; Proceedings of the 2006 international workshop on Dynamic systems analysis; May 23, 2006; pp. 65-72 (8 pages) (Year: 2006).*

* cited by examiner

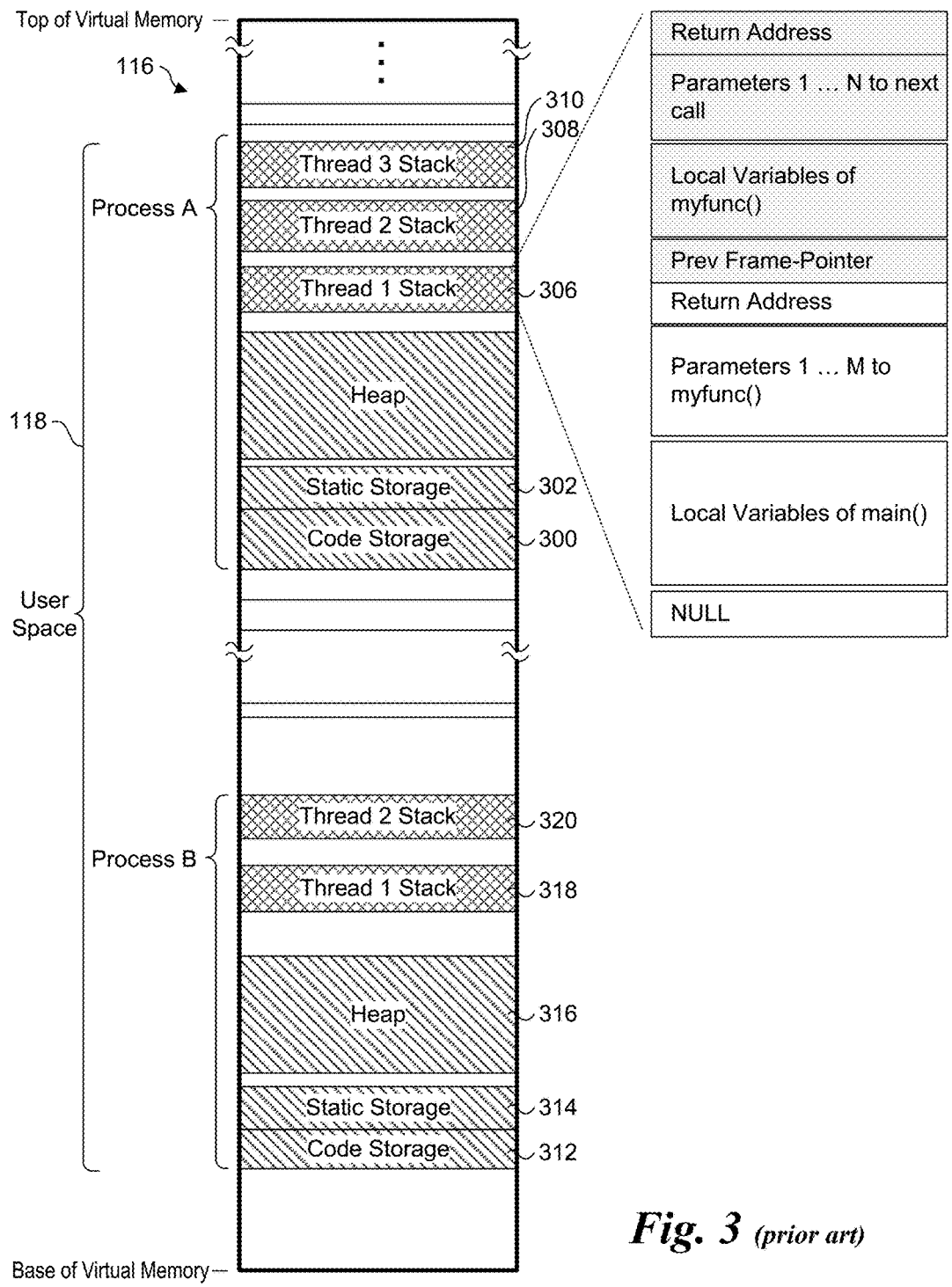
Fig. 3 *(prior art)*

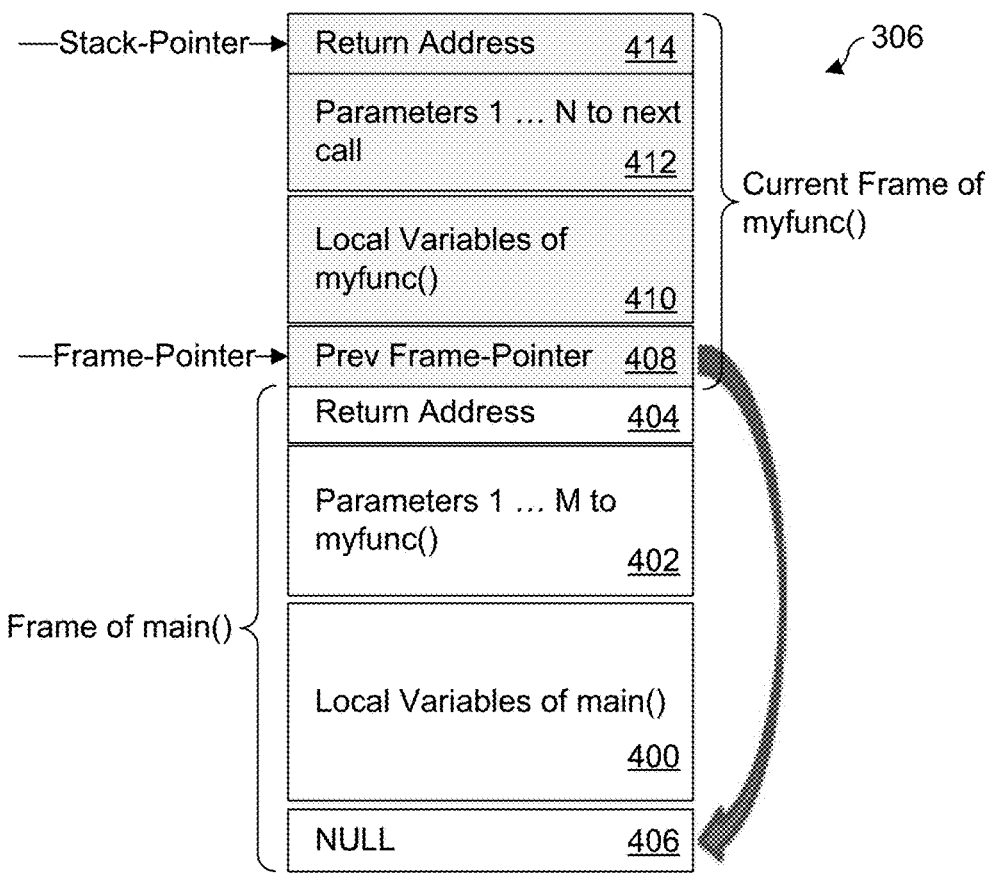
Fig. 4 *(prior art)*
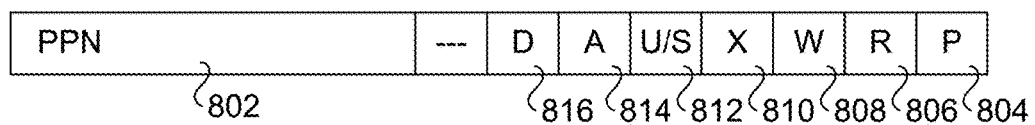
Fig. 8 *(prior art)*

SECURE MEMORY CONTROLLER

BACKGROUND INFORMATION

Software vulnerabilities to malicious code are well-known and represent significant threats to industry and personal computer use. One type of vulnerability is the corruption of an application's run-time stack in a way that overwrites return addresses to a location containing malicious code. For example, through code vulnerabilities, a malicious code vector may be introduced to allow an attacker to overwrite executable code values, such as return addresses or function/method pointers, with a value that causes the execution to be redirected to the attacker's malicious code. These are generically known as buffer overflow attacks. A specific type of overflow, known as a stack overflow, overwrites a return address stored on the stack. These types of attacks, which are at the user level, are responsible for billions of dollars in damages, and have been used to harm millions of users.

Another type of vulnerability concerns gaining illegal access to regions of memory outside a process's valid pages by modifying virtual address mappings in an operating system's page tables. Although less common that buffer overflow attacks, these types of attacks may result in greater damage, including corrupting the operating system.

The conventional way to prevent malicious code attacks is using security software, such as malware protection and antivirus products from companies such as McAfee, Norton, and Kaspersky. The products, while useful, are imperfect, and cannot prevent some vulnerabilities from being exploited by an attacker. In particular, each of these products work at the software level, and are designed to detect and remove or prevent access from known malicious code. As a result, it would be advantageous to provide an additional level of security to prevent malicious code attacks at the hardware level.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 is a schematic diagram illustrating memory allocation and usage for a pair of processes;

FIG. 4 is a schematic diagram illustrating a thread stack including a pair of stack frames;

FIG. 8 a diagram of an exemplary page table entry;

DETAILED DESCRIPTION

Figure 1:
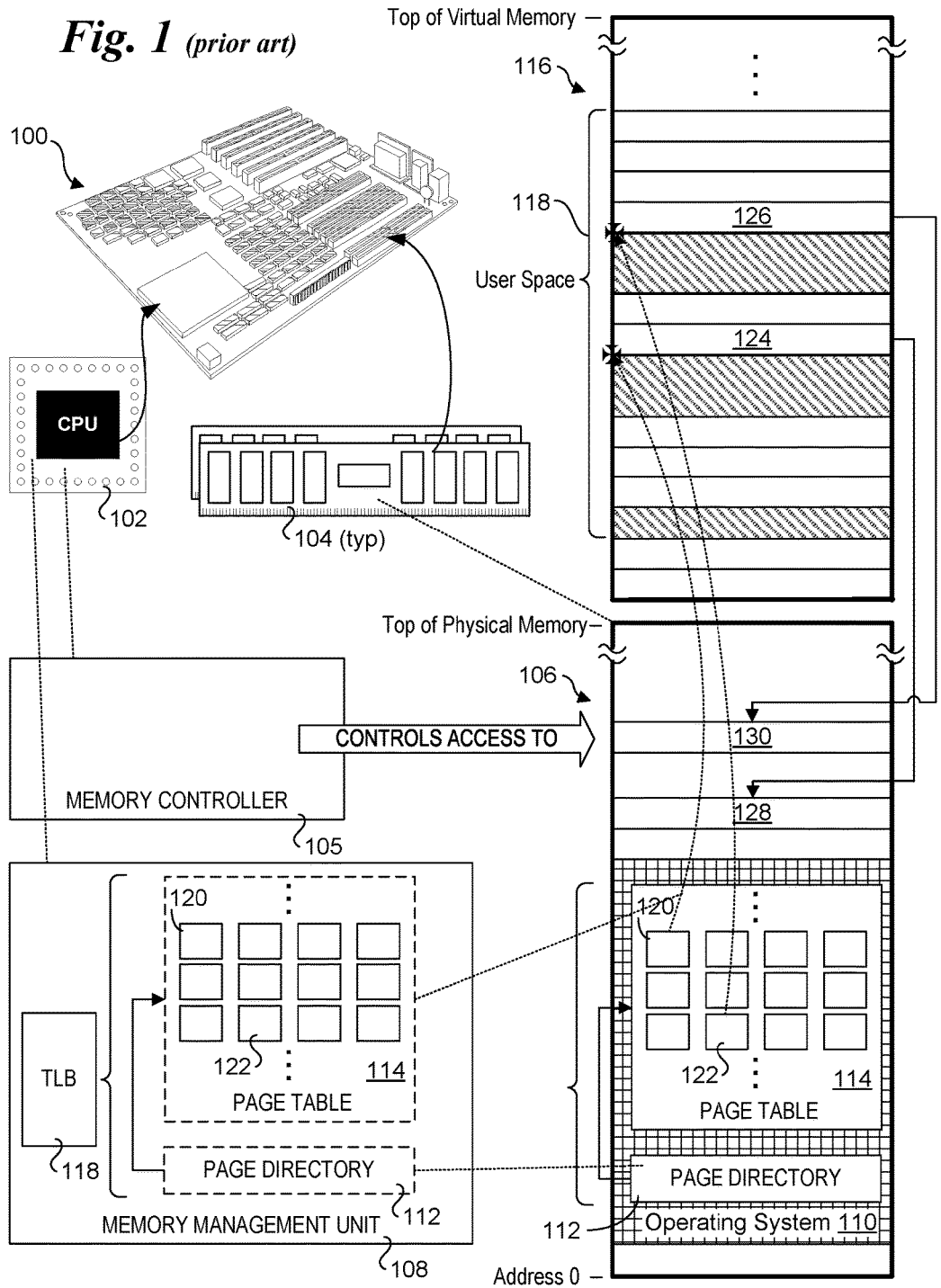
FIG. 1 is a schematic diagram of a computer system detailing aspects relating to memory access to system memory controlled by a memory controller using page tables and virtual-to-physical address translation.

Embodiments of methods and apparatus for a secure memory controller are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

The embodiments herein relate to a secure memory controller that is configured to prevent malicious code from writing to protected regions of interest in system memory. To have a better understanding and appreciation a memory controller and associated components provide access to system memory, the following discussion of system memory access using page tables is provided.

FIG. 1 shows a high-level view of a computer hardware architecture and how of memory is accessed on the computer using a conventional approach. The computer includes a system board 100 (also commonly referred to as a main board or motherboard) having a central processing unit (CPU) 102 and system memory comprising dual in-line memory modules (DIMMs) 104. CPU 102 is illustrative of various types of processors, including processors that employ System on a Chip (SoC) architectures. Historically, memory access on personal computers and servers were facilitated by a chipset including a CPU and a separate memory controller chip (such as a memory controller hub under INTEL® Corporation's Northbridge-Southbridge architecture). Under an SoC architecture, one or more memory controllers are integrated on the same chip as the processor core, such as depicted by a memory controller 105 in FIG. 1.

Modern computer systems employ virtual memory schemes through a combination of hardware and software. At the hardware level, system memory is laid out as a linear address space called the physical address space, such as depicted by a physical address space 106 in FIG. 1. The physical address space has an address range from a base address 0 to the top of physical memory, which correlates to the amount of physical memory available in the system (e.g., 1 Gigabyte (GB), 4GB, 8GB, etc.). Memory controllers access (write and read) data stored in system memory via corresponding physical addresses in the physical address space. For example, under a coherent memory architecture, data is addressed using fixed-size blocks referred to as cachelines, with each cacheline having a unique address. A 32-bit system uses 32-bit addressing for the cachelines, while a 64-bit system uses 64-bit addressing.

Under a virtual memory scheme, the physical address space of system memory is mapped to a virtual address space, typically using a paging scheme (noting other address mapping schemes are also used). In addition, pages of virtual memory may be swapped in and out of mass storage. The use of virtual memory provides the operating system (OS) with greater flexibility in terms of where application data and code is stored and also enables the system to operate as if it has more memory than the amount of physical memory that is actually installed. In addition, memory virtualization enables virtual machines to run on a host platform's physical hardware.

Under the scheme illustrated in FIG. 1, CPU 102 includes a memory management unit (MMU) 108 that is used in conjunction with an operating system 110 to generate and store mappings between virtual memory pages and corresponding memory pages in physical memory. This is accomplished, in part, through address translation provided via use of a page directory 112 and multiple page tables 114 that are stored in physical memory 106 and accessed via MMU 108. During initialization, operating system 110 is loaded into physical memory 106 at a predetermined base address. Subsequently, the OS configures data in page directory 112 and pages table 114 to create address translation data used to map pages in a virtual address space 116 to corresponding pages in physical memory 106. To reduce accesses to physical memory 106 to obtain the page table mapping data, MMU 108 uses a translation lookaside buffer (TLB) 118 to cache page directory and page table data.

Figure 2:
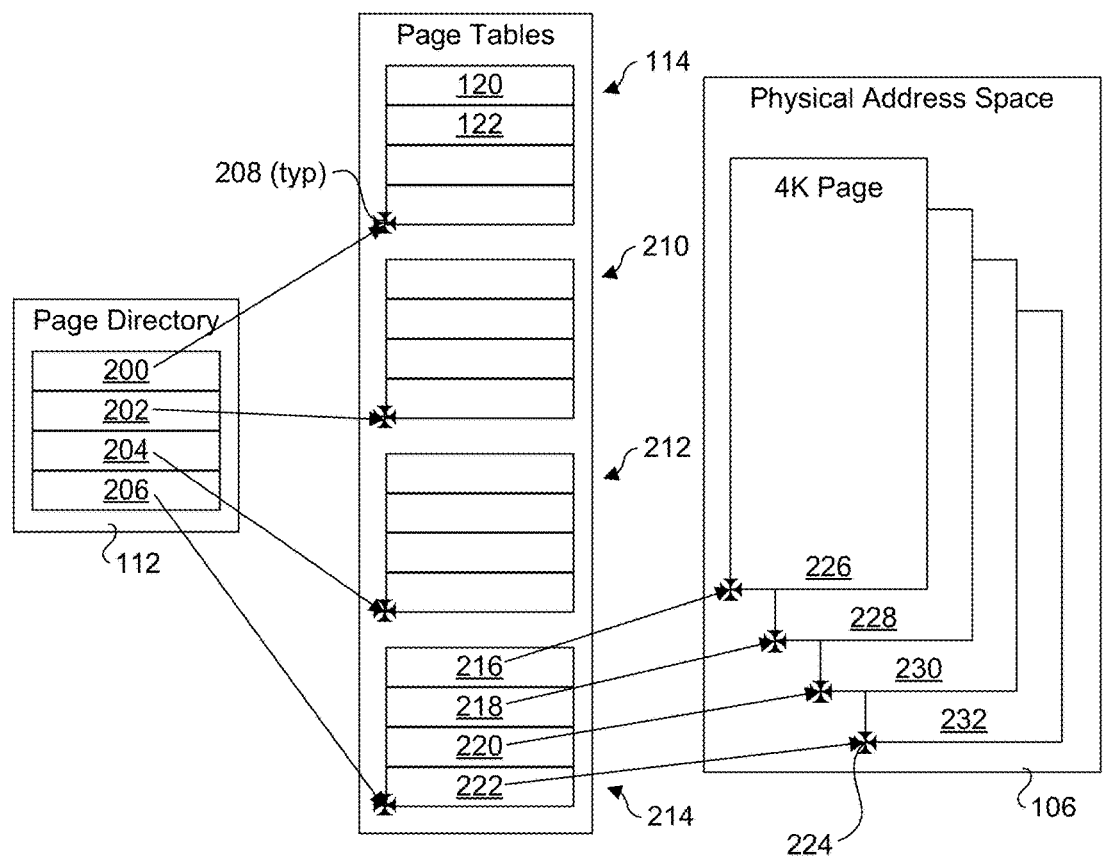
FIG. 2 is a schematic diagram illustrating a virtual-to-physical address translation scheme using page table directories, page tables, and memory pages in a physical address space.

An exemplary set of page directory and page table configuration data is shown in FIG. 2. Page directory 112 includes a number of page directory entries 200, 202, 204, and 206, each of which points to the location (physical address 208 of) a respective page table 114, 210, 212, and 214. In turn, each page table has a number of page table entries (PTEs), as illustrated by PTEs 216, 218, 220, and 222 for page table 214. Each PTE points to the base address 224 of a corresponding page in the system's physical address space 106, as depicted by pages 228, 230, 232, and 234. In the example of FIG. 2, each physical page has a size of 4K (4096) Bytes, although other page sizes may be used, as well.

Returning to FIG. 1, page table 114 includes multiple PTEs, including PTEs 120 and 122, which point to respective pages 124 and 126 in virtual address space 116. As further shown in FIG. 1, the actually physical location where virtual pages 124 and 126 reside in physical memory 106 are a physical memory page 128 and a physical memory page 130, respectively.

During OS runtime operations, when the OS launches applications (referred to as processes under some operating systems such as Windows and Linux) the OS allocates a portion of its virtual memory address space 116 to the process. Two examples of virtual memory allocations for processes A and B are shown in FIG. 3. Generally, a given process will include fixed storage requirements for code and static data, as well as a variable size heap and a predetermined-size stack for each thread associated with the process. For process A, the virtual memory allocation includes code storage 300, static storage 302, a heap 304, and stacks 306, 308, and 310 for respective threads 1, 2 and 3. For process B, the virtual memory allocation includes code storage 312, static storage 314, a heap 316, and stacks 318 and 320 for respective threads 1 and 2. User application processes are run in user space 322, which is accessible to code running in "user" mode.

In a multi-threaded process, each thread has its own stack, while all threads share the heap. A stack is used to store temporary variables created by each function called by the stack's associated thread. The stack is a LIFO "last in, first out" data structure that is managed and optimized by the CPU. When a function declares a new variable, it is "pushed" onto the stack. When the function exits, all of the variables that were pushed onto the stack during that function's execution are popped off of the stack.

The heap, also known as the free store, and includes memory that is allocated at runtime by the process. For example, memory data structures such as arrays and vectors are stored on the heap.

In one embodiment, at system initialization, and at various times during the creation of processes, the CPU communicates with the memory controller, specifying the regions of interest, including:

1. The start and (optionally) end of a user-mode run-time stack; and
2. The start and (optionally) end of a kernel-mode run-time stack.

This information of address ranges and their purpose is stored inside the memory controller. Alternatively, the memory controller is programmed to train itself to infer the location of stacks in user space and kernel space based on observing memory access patterns, as described below.

During normal operation, the memory controller watches every transaction if it belongs to a specified address-region in its list or otherwise in a region of interest inferred through observation of access patterns. It then checks if the access conforms to the policy set for that region. If the access is an "offending" one, then the transaction is aborted and a fault signaled to the CPU. In a simple architecture, this could be an MCA (machine check architecture) error, but variations are possible where the controller returns a set of values. This set can be considered as error-codes ordered from least severe to fatal, and the CPU can determine how to proceed, accordingly.

In further detail, in one embodiment, the memory controller examines the read/write transactions to the user and kernel level stacks. Since the controller can only "see" limited information, it needs to infer how the stacks are growing with function calls, and shrinking with returns. By observing the most recent accesses, it can infer whether the CPU is in user mode or kernel mode. It can also infer the stack frames, infer the location where return addresses are written, and then ensure they do not get corrupted.

Any processor that runs modern software programs requires the ability to manage function/sub-routine calls and returns. As discussed above, this is done with a special region of memory called the stack, which handles call/return to sub-routines. However, due to software bugs in programs, or malicious attacks, a program thread may be caused to branch to unintended code and execute such code. To prevent such errant behavior, additional functionality is added to the memory controller to enable the controller to check for good stack behavior (particularly focused on the return addresses) and flags anomalies through fault/error signals. This is done for user-mode and kernel-mode stacks, but in what follows, only a single stack is shown.

Background of Call Stacks

The call stack (also called run-time stack or simply stack), is meant to hold the frames (also known as activation records) of the functions under execution. Each frame will hold variables that are local to the function's invocation context, input parameters that were passed into the function during the call, return address to go-to when the function completes, etc. Frames are "pushed" on to the stack during function calls, and "popped" off upon return. The most-recent frame will thus correspond to the currently executing function. Note that having a new frame for each call enables supporting recursively calling the same function as each frame will have different values in the variables/parameters.

Stacks are manipulated by CPUs using two pointers, one called the stack-pointer and the other the frame-pointer. The frame-pointer points to the base/start of the frame of the currently executing function, whereas the stack pointer denotes the top/end of the stack. CPUs also have special instructions for managing call stacks such as push, pop, call, ret (x86). In the INTEL® x86 architecture, the two pointers are held in special registers called rsp (stack) and rbp (frame).

FIG. 4 shows further details of stack 306 of FIG. 3, which corresponds to the stack for thread 1 of process A. A process always has a first thread commonly referred to as the main thread for applications compiled from source code using languages such as C, C++, and Java. For the purpose of simplicity and clarity, the description of code execution below is at the source code level; those skilled in the computer arts will understand that the source code is compiled into machine executable code, and this compiled code is what actually is executed on a processor.

During launch of the application, the corresponding process begins execution at the main( ) function. Thus, a first frame (corresponding to main( )) is added to stack 306, which includes local variables of main( ) 400. main( ) includes a call to a function named myfunc( ) and the frame for main( ) includes parameters 402 for myfunc( ). At the top of the frame is a return address 404. At the bottom of a frame is a previous frame-pointer. For the frame of main( ) previous frame-pointer 406 has a value of "NULL" since it is the first frame that was put onto stack 306.

When the code for the main( ) function executes the call to myfunc( ) a new frame is added to stack 306 on top of the frame corresponding to the caller, which is main( ) in this example. The new frame becomes the current frame for the corresponding function that was called, which in FIG. 4 is the frame of myfunc( ). As with the frame of main( ) at the start of the frame is a previous frame pointer 408. In this case, the value is not NULL, but rather points to the start of the frame of main( ) the previous frame.

The frame of myfunc( ) also includes local variables of myfunc( ) 410, parameters for a next function call 412, and a return address 414. Upon reaching the end of a function, the thread's execution returns (via execution of a return instruction) to the return address of the function that was previously pushed onto the stack when the function was called (return address 414 in this example). The return address corresponds to the address specifying the instruction the instruction pointer of the processor should load upon executing the return instruction. The stack-pointer points to the current top of the stack.

Note that in addition to the parameters that are passed between functions and local variables, registers are also saved and restored to/from the stack (depending on the CPU Architecture, Software System). These details are not shown in FIG. 4 for simplicity, but the register state can be considered as part of the parameters (for registers saved by the caller) or the local variables (for registers saved by the callee).

The previous frame-pointer is stored at the beginning of each frame to enable popping the frame upon return. The following is a typical call/return sequence and the operations that execute on the CPU (as a matter of notation, the stacks grow with decreasing memory addresses):

```
//Before call
Push caller-saved register state
Push parameters
Call myfunc        // push return-address on stack and jump
    // entering myfunc
    Push RBP    // previous frame-pointer
    RBP = RSP
    RSP = RSP - sizeof(local variables)   // just create
                                          //space on stack
    Push callee-saved register state
    ...
    // real work in myfunc
    ...
    // Before return
    Pop callee-saved register state
    RSP = RBP
    RBP = Pop Stack
    Ret   // pop return address and jump
// in calling function after call to myfunc finishes
RSP = RSP + sizeof(parameters) // just skip on stack
Pop caller-saved register state
```

Checking Behavior of Call Stacks

During runtime operations, the behavior of call stacks is observed to detect for aberrant behavior caused by malicious code. In one embodiment the memory controller is given a list of regions that are associated with program execution stacks (i.e. for each stack, the start and end of the stack segment). Optionally, regions of interest associated with stacks are inferred by the memory controller through observation of memory access patterns. During regular program execution, the controller monitors read/write accesses to the region and infers whether the stack is well-behaved. In one embodiment, this scheme assumes that there is no further information communicated between the CPU Core and the memory. This therefore makes the scheme scalable to any memory (including any caches in the coherent memory sub-system), and does not require any changes to bus protocols—all inferring is done by examining the address and data of read/write operations to memory.

The main challenge in this case is that the controller does not know where the top of the stack is at any given time, because all it can observe is a set of read and write operations to the region. The scheme infers calls/returns and infers the structure/size/location of the function frames. Note that despite instructions such as call/ret, or push/pop in some CPU instruction set architectures, all the memory controller (which does not execute these functions) can observe from the corresponding memory accesses is a read/write to some address in the stack region. The key concept is that the memory controller maintains its own local (predicted) copy of the frame-pointer that it dynamically adjusts as described below. It can then infer other properties of the stack and decide if they are appropriate.

During a function call, a burst of memory controller writes is expected to be observed. This includes writes relating to:
1. Register state
2. Parameters
3. Return-address
4. Previous Frame-pointer
5. SKIP some addresses for locals
6. Register state The memory controller can check for this burst pattern and specifically check if the previous frame pointer being written matches the memory controller's local version of the previous frame-pointer that it maintains (at the start, the memory controller assumes the first frame starts at the beginning address of the stack region). If a match is detected, we know a valid frame has been created for a new function call. In addition, the controller can check for a few simple things like ensure the region that was skipped for local variables is always initialized before use. Most importantly, until/unless it detects a return pattern, the controller ensures that the return-address field is not over-written. It determines the location of the return-address field as that's always a fixed offset from the frame-pointer.

Figure 5:
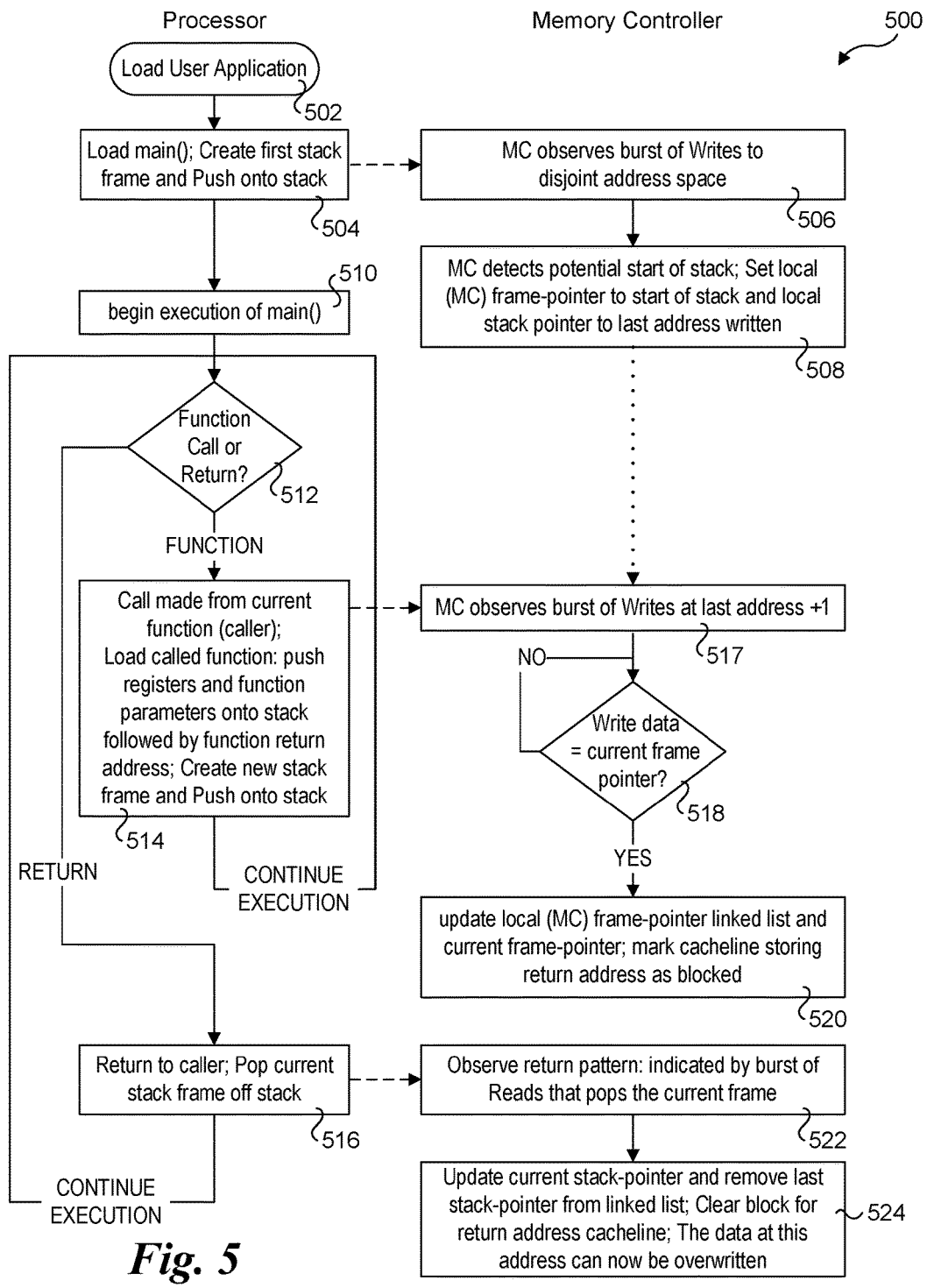
FIG. 5 is a flowchart illustrating operations and logic performed by a processor and memory controller to support secure memory access to thread stacks via the memory controller, according to one embodiment.

A flowchart 500 illustrating operations and logic performed by a processor and memory controller to support secure memory access via the memory controller is shown in FIG. 5. As exemplary usage pattern corresponding to flowchart 500 in connection with execution of the following user application (LISTING 1) is illustrated in FIGS. 6a-6g.

LISTING 1

```
int main(int argc, char *args[ ])
{
int a, b, c, d;
    var a = atoi(args[0]);
    var b = atoi(args[1]);
    c = myfunc(a, b)
    d = bar(c)
    return(0);
}
int myfunc(int a, int b)
{
    int e, f;
    e = a + b;
    f = foo(a, e)
    return f;
}
int foo(int a, int e)
{
```

LISTING 1

```
    int i;
    for (i = 0; i < a; i++)
        e += e;
    return e;
}
int bar(int g)
{
    int j;
    for (j = 0; j < 10; j++)
        g --;
    return g;
}
```

Figure 6A:
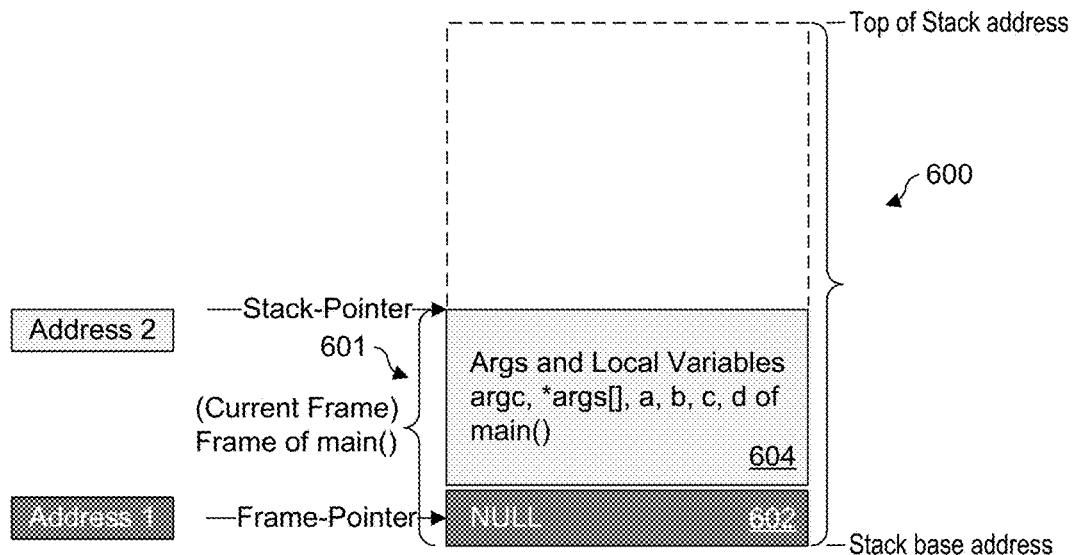
FIG. 6*a*-6*g* are schematic diagram illustrating a sequence of stack states in connection with executing code LISTING 1, further illustrating objects for which data is stored on the secure memory controller, including current frame-pointers, a frame-pointer linked list, and return addresses.

The process begins with a start block 502 corresponding to the user application being loaded for execution. During this process, a region of memory is allocated for the stack for the application's main thread. An exemplary region of memory allocated for a stack 600 in shown FIG. 6a. The operating system allocates stacks for user applications in the user space of the OS's virtual address space and manages access to the stack using virtual addressing. Meanwhile, the stack actually occupies physical system memory that is accessed via the memory controller. Typically, the OS will allocate a stack having a predetermined size, such as a default size, or a size specified by the application during development. For example, various integrated development environments, such as Microsoft's Visual Studio, enable developers to set the stack size to be used for an application. As shown in FIG. 6a, stack 600 includes a base stack address and a top of stack address.

In a block 504, the application's main( ) function is loaded, along with its arguments (aka parameters). In connection with loading the main( ) function, a first stack frame is created and pushed onto the stack. This is illustrated in FIG. 6a as a stack frame 601; stack frames are also labeled in the Figures herein by their function name, such as "frame of main( )" for the main( ) function. The first entry in the stack is a previous frame pointer 602, which is written at stack 600's base address. A previous frame-pointer is a pointer to the previous frame. For the first frame, there is no previous frame, so the previous frame-pointer value is 'NULL'.

The next set of entries is the local variables for the main( ) function, as depicted by args and local variables 604. These will include the arguments passed in with main( )(argc and *args[ ] in line 1 of LISTING 1), and its local variables a, b, c, and d (line 3). Each argument and variable will be written at a separate address in a sequential order, wherein the size of the variable in memory will being dependent on its type (e.g., int, long, float, double, etc.) in combination with the memory addressing scheme implemented for the application (e.g. 32-bit or 64-bit). For simplicity, the addresses for the variables for the functions illustrated herein are shown as a single block in the stack.

As discussed above, in one embodiment the memory controller is provided with information identifying the location of stacks in user-space and kernel-space. For example, in one embodiment this information is passed to the memory system agent on the memory controller, and the system agent then stores corresponding stack configuration information in local memory and/or registers on the memory controller.

In another embodiment, the memory controller is not provided with any explicit information pertaining to the location of stacks, stack frames, heaps, etc. Moreover, the memory controller is not even provided with any explicit information regarding the address regions used for user applications, nor the OS kernel. Rather, the memory controller is programmed with logic to determine the locations of stacks, stack frames, and user and kernel address spaces through observing patterns of access for the system memory.

One of the memory access patterns the memory controller is configured to observe is bursts of writes. When a stack frame is added to a stack, the memory controller will see a burst of writes including writes to the previous frame and the local variables for a called function. This will also include writes relating to the register state; however, for purposes of clarity and to avoid clutter the writes to the register states are not shown in FIGS. 6a-6g. However, from the perspective of the memory controller, it only sees writes to a small range of sequential addresses, which it associates as a region of interest in the physical address space.

In the case of a burst of writes corresponding to a new stack, the first write will be written to a disjoint memory address. For the purposes herein, including the claims, a disjoint memory address means a memory address that follows a memory address that hasn't been recently written to. There are various means the memory controller can use to track access patterns to system memory, including keeping access pattern data in local embedded memory (on the memory controller) or marking selected cachelines in system memory with encoded data relating to memory access pattern data maintained by the memory controller.

Returning to flowchart 500, in connection with the burst of writes performed when stack frame 601 is written to memory, the memory controller observes a burst of writes to a disjoint address space in a block 506. In a block 508 the MC detects the first address of the burst of writes as a potential start of a stack. It then sets a local frame-pointer (employed by the memory controller) to this first address, and a local stack-pointer to the last address written to by the burst. These addresses coincide with the frame-pointer and stack-pointer maintained by the operating system (as predicted by the memory controller), but rather than the virtual addresses used by the OS, the local frame pointer and stack pointer corresponds to the physical addresses in system memory. At this stage, the frame-pointer and stack-pointers are potential candidates for actual frame- and stack-pointers, as explained in further detail below. Accordingly, the memory controller stores the address of each of the local frame-pointer and stack-pointer, as depicted by Address 1 and Address 2, respectively.

After the main( ) function is loaded, it begins being executed by the processor in a block 510. During execution of a given function, the function's code may perform various types of operations, such as mathematical calculations, character- and string-related functions (e.g., writing data to a file or buffer, reading data from a file or buffer), performing graphics-related operations, etc. A function also may call another function, which causes the execution flow to jump to the called function's code. Each function will terminate via some type of return operation, either via reaching the end of the function (implicit return) or executing an explicit return instruction for functions that return data (i.e., non-void functions).

As depicted by the loops depicted in flowchart 514 connecting a decision block 512 and blocks 514 and 516, the operations of these blocks are performed in a continuous manner during execution of the user application. Corresponding operations performed by the memory controller are also performed in an ongoing manner, based on memory access operations associated with the execution of the user application's code.

Figure 6B:
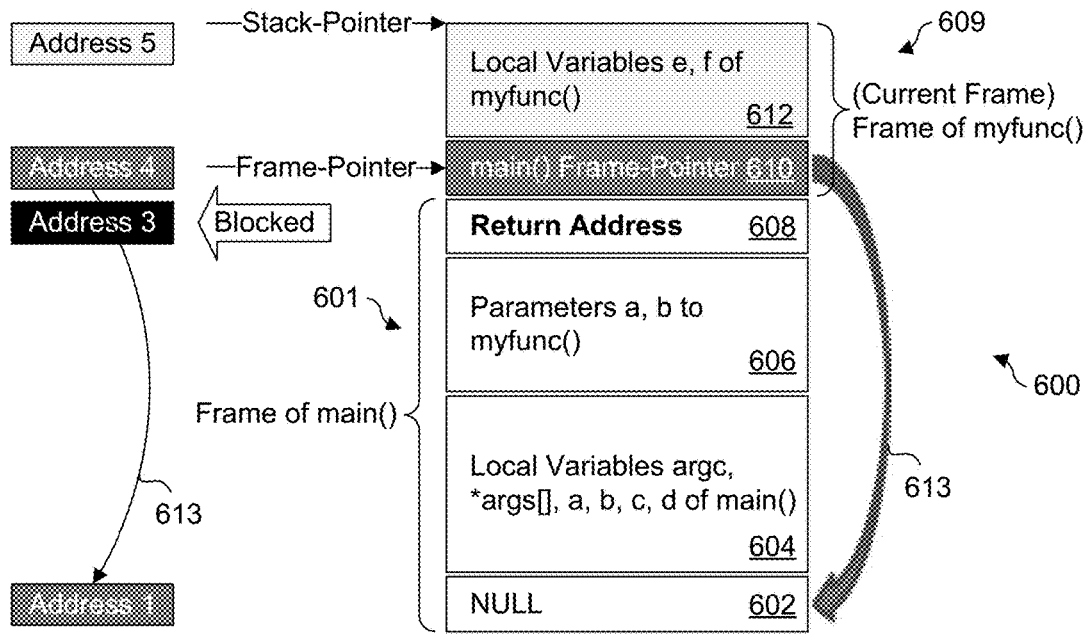

In decision block 512, a determination is made to whether the instruction to be executed is a function call or a return. With each function call, a new stack frame will be created and added to (Pushed onto) the stack. Prior to creating and pushing the new stack frame, data in applicable registers are pushed onto the caller's stack frame (not shown), along with the parameters (aka arguments) of the called function. For example, when the main( ) function reaches line 6, it calls myfunc( ) passing in parameters a and b. Accordingly, myfunc( ) parameters 606 (a and b) are added to stack frame 601, as shown in FIG. 6b. In addition, the return address 608 of the called function is added to the caller's stack frame, as depicted by return address 608 in FIG. 6b.

As further shown in FIG. 6b, a new stack frame 609 is pushed onto stack 600 following return address 608. Stack frame 609 is the stack frame for myfunc( ) the called function. As with frame 601, the first entry for stack frame 609 is a frame-pointer to the previous frame, as depicted by main( ) frame-pointer 610. Following this are the local variables 612 (e and f) for myfunc( ).

As depicted in a block 517, the operations of block 514 results in a burst of writes, beginning at the address following the previous stack-pointer address (Address 2). As discussed above, the memory controller has previously stored the local current frame-pointer for stack frame 601, which corresponds to Address 1. As new objects are pushed onto the stack via memory writes, the memory controller captures the memory write data and determines whether any of the data matches any addresses it is currently "watching." In a decision block 518 the memory controller detects the data value of a memory write matches its local current frame-pointer. The main( )frame-pointer 610 value points to Address 1, the current frame-pointer. Thus, when the memory controller detects a write having the value of Address 1, it determines that the corresponding address for the write is a candidate for the start of a new stack frame. This is depicted as an Address 4 in FIG. 6B. As further illustrated in FIG. 6b, this address is added to a linked list of frame-pointers 613 that includes Address 1 and Address 4, in accordance with operations performed in a block 520 of flowchart 500. The current frame-pointer value is updated to Address 4.

As shown in FIG. 6b, the start of a stack frame begins at the address (Address 4) following the return address for a called function. Using this knowledge, the memory controller determines that return address 608 is a candidate for a return address. In one embodiment, the value of a memory address that is determined to be a return address is prevented from being overwritten until the program execution returns properly from the associated called function. Accordingly, the memory location corresponding to the address of return address 608 is marked as blocked by the memory controller, as shown in a block 520 and FIG. 6b.

In some embodiments where stacks stay aligned with cachelines, the cacheline corresponding to the memory location is marked as blocked (which may be effected by marking the address of the cacheline as blocked). In other embodiments in which stack entries may become unaligned with cachelines, the address of the memory location is blocked (or, optionally, the address of the applicable cacheline plus an offset to the memory location within the cacheline is blocked).

Returning to LISTING 1, at this point execution of myfunc( ) begins at line 12 and proceeds to line 16, which includes a call to function foo( ). This results in a FUNCTION output from decision block 512, and similar set of operations is performed in block 514 as described above.

Figure 6C:
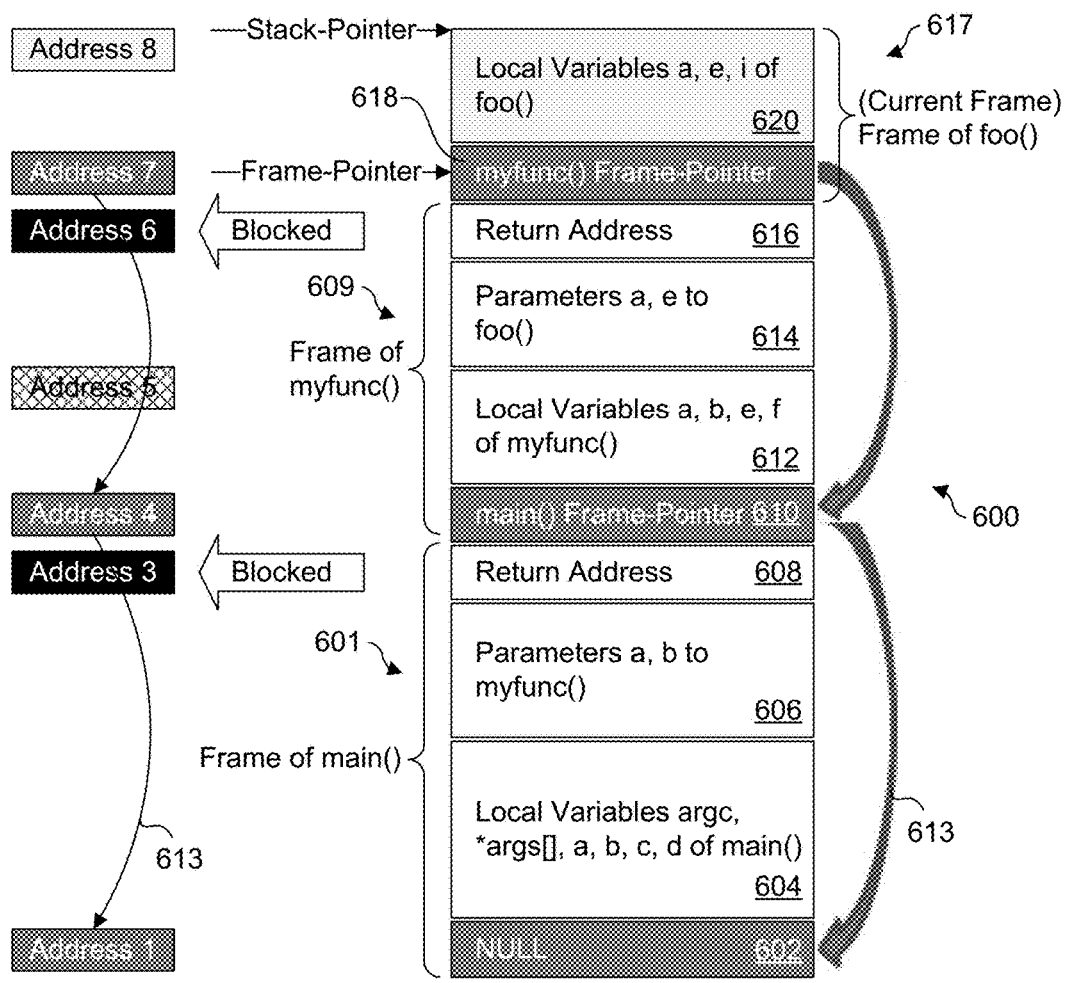

The results of these operations is shown in FIG. 6c. As before, register data is pushed onto the stack (not shown), followed by pushing the parameters a and e of the called function foo( ) onto the stack, as depicted by foo( ) parameters 614. Next, return address 616 is pushed onto stack 600, extending the size of stack frame 601.

A new stack frame 617 corresponding to function foo( ) is then pushed onto stack 600, which initially includes a previous frame-pointer 618 and local variables 620 (a, e, i) for function foo( ). In decision block 518, previous frame-pointer 618 is detected by the memory controller as a start of frame candidate by detecting the pointer's value as pointing to Address 4, the current frame-pointer value. As a result, the logic proceeds to block 520, which adds previous frame pointer 618 to the end of the frame-pointer linked list 613 as Address 7, updates the current frame-pointer to Address 7, and marks the address at which return address 616 is stored (Address 6 ) as blocked.

Figure 6D:
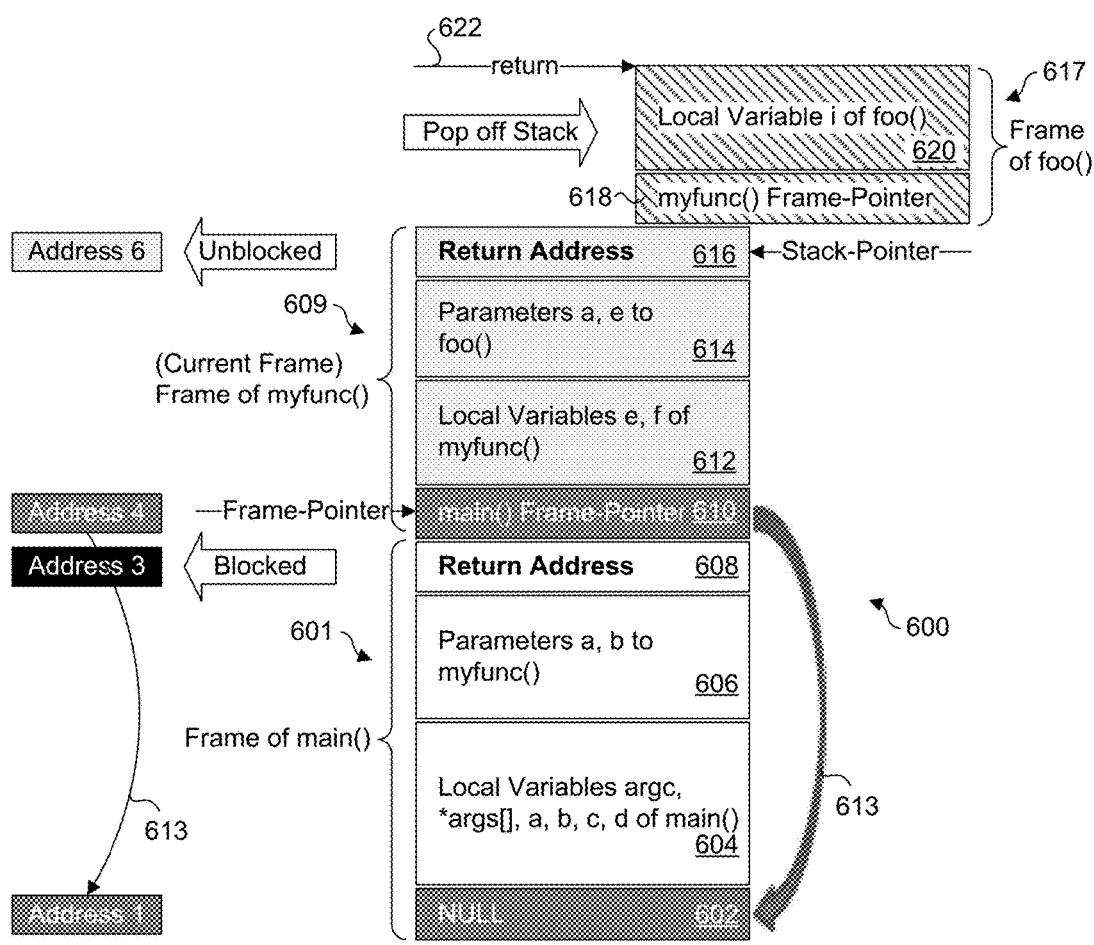

Upon being loaded, execution of function foo( ) begins at line 21 of LISTING 1, and execution of function foo( ) continues until the function ends with an explicit return instruction at line 25, as shown as a return 622 in FIG. 6d. When the return instruction is executed, the answer to decision block 512 is "RETURN," causing the flowchart logic to proceed to block 516.

Execution of a return instruction returns execution to the calling program at return address that was added immediately before the new stack frame. In this example the return from function foo( ) is return address 616. In connection with the operation of block 516, the current stack frame (617) is "popped" of off the stack, as shown in FIG. 6d. From the application and OS's perspective, popping a stack frame off of the stack returns execution to the return address at the top of the previous stack frame, and updates the stack-pointer to this address. From the perspective of the memory controller, it observes a burst of memory reads in the region of interest and detects this as matching a return pattern, as depicted in a block 522 of flowchart 500. In one embodiment, the memory controller trains itself through machine learning and heuristics to detect burst of reads in connection with popping off a stack frame as corresponding to the current stack frame being popped off of the stack.

After the current stack frame is popped off of the stack, the previous stack frame becomes the new current stack frame, and the previous stack frame's frame-pointer is removed from the end of the frame-pointer linked list 613, as shown in a block 524. Since the return from the called function is proper (return is to return address 616), the return address is no longer needed. As a result, the memory controller unblocks the memory address (i.e., the address' corresponding memory location) at which the return address is stored is cleared (unblocked), as shown in block 524, which enables the memory location's data to be overwritten.

The return of a called function to the caller returns program execution to the point at which the function was called in the caller's function. In the current examiner, completion of function foo( ) returns execution to line 16 of myfunc( ) in LISTING 1. The next instruction at line 17 is a return instruction that causes the application's execution to return from function myfunc( ) to line 6 of the main( ) function, as depicted by a return 624 in FIG. 6e.

Figure 6E:
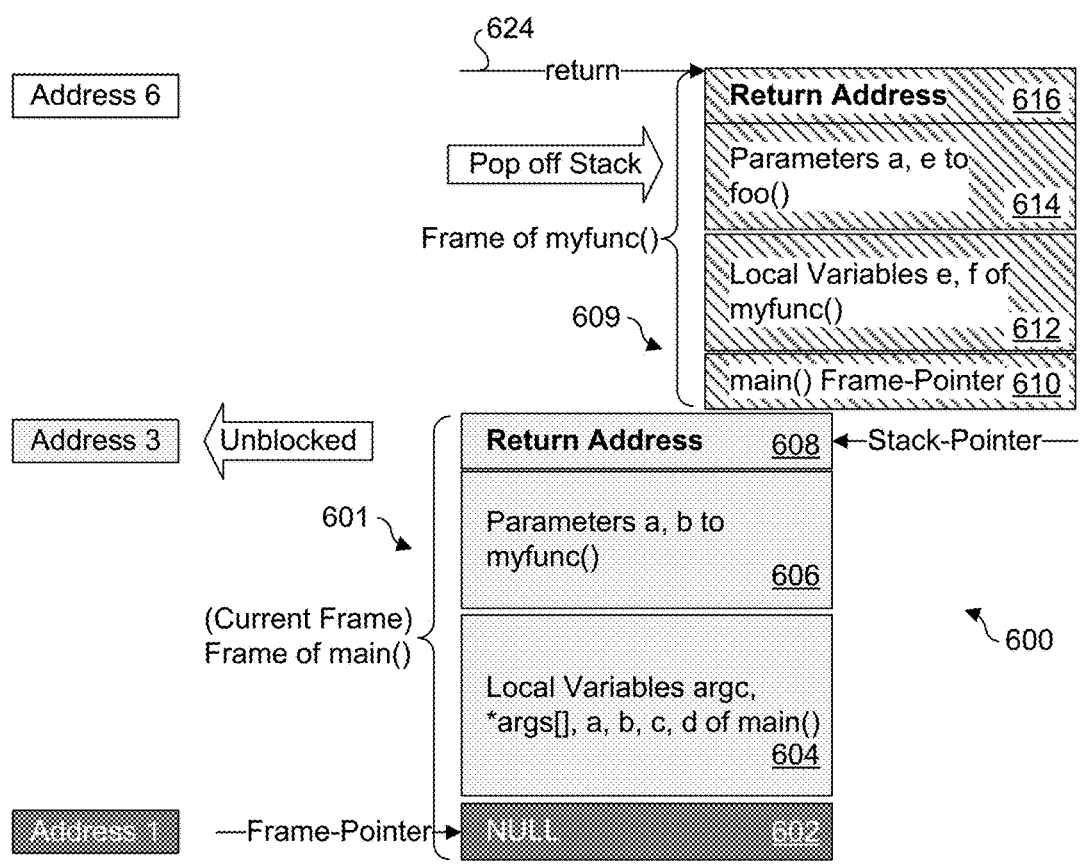

As above, this return to the calling function pops the current stack frame off of the stack in block 516. This pattern is observed by the memory controller in block 522, and is detected as a stack frame being popped off of the stack. As shown in FIG. 6e, stack frame 609, the stack frame for myfunc( ) is popped off of stack 600. This further results in the current stack-pointer being updated to point to Address 3, which is unblocked, enabling its corresponding memory location to be overwritten. The current frame pointer is also updated to point to Address 1, and Address 4 is removed from the end of the frame-pointer linked list 613, which now only includes a single entry for Address 1 and frame-pointer 602.

Figure 6F:
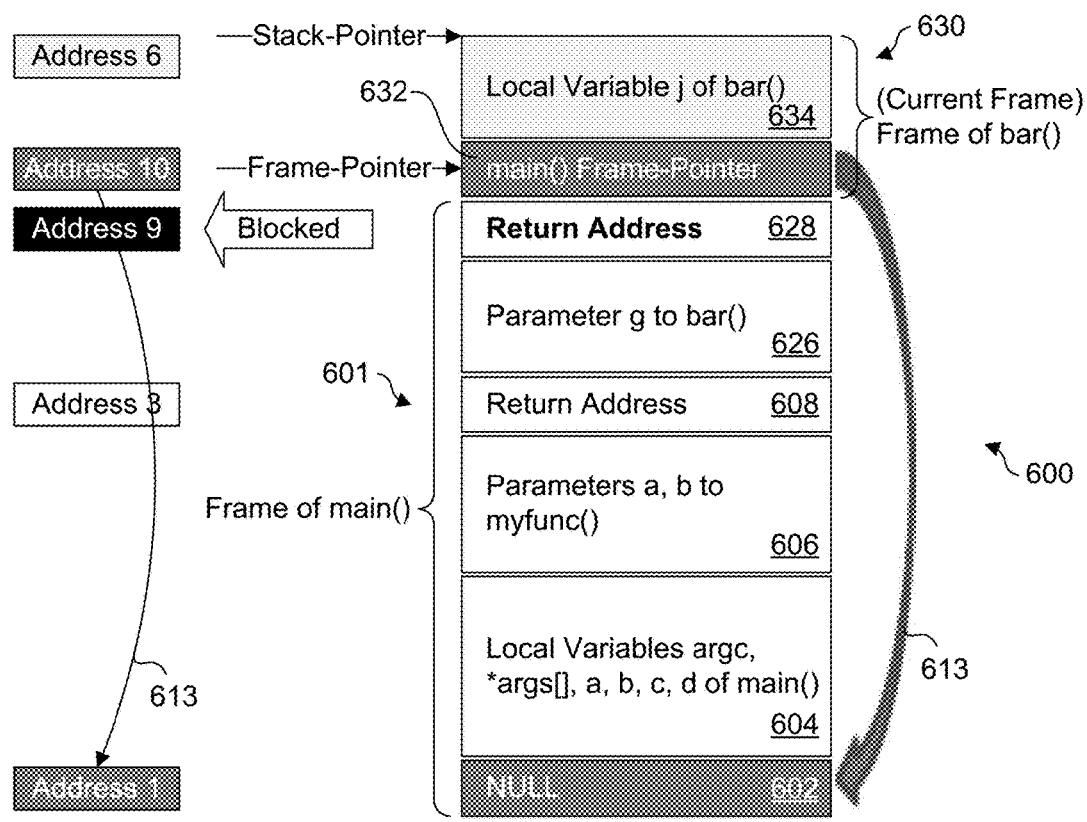

Following line 6 of main( ) is a call to function bar( ) in line 7. This is detected as a FUNCTION in decision block 512, and similar operations to those described above when a function is called is performed in block 514. As shown in FIG. 6f, this results in parameters 628 to bar( ) being pushed onto stack 600, following by a return address 628, both of which are added to stack frame 601. A new stack frame 630 is created including a previous frame-pointer 632 and local variable j 634 of bar( ) which are each pushed onto stack 600. In decision block 518, the memory controller detects that previous frame-pointer 632 points to the current frame-pointer 602, which adds Address 10 for frame-pointer 632 to the frame-pointer linked list 613. In addition, the memory controller detects that return address 628 is a return address that hasn't been properly returned to and blocks its corresponding Address 9 to prevent it from being overwritten. The stack-pointer is updated to point to Address 11, the top of the stack frame 630, the new current frame. Writing local variable 634 of bar( ) results in overwriting of the previous data at Address 6, which previously corresponded to return address 616. However, since return address 616 was unblocked, writing to Address 6 is permitted.

Figure 6G:
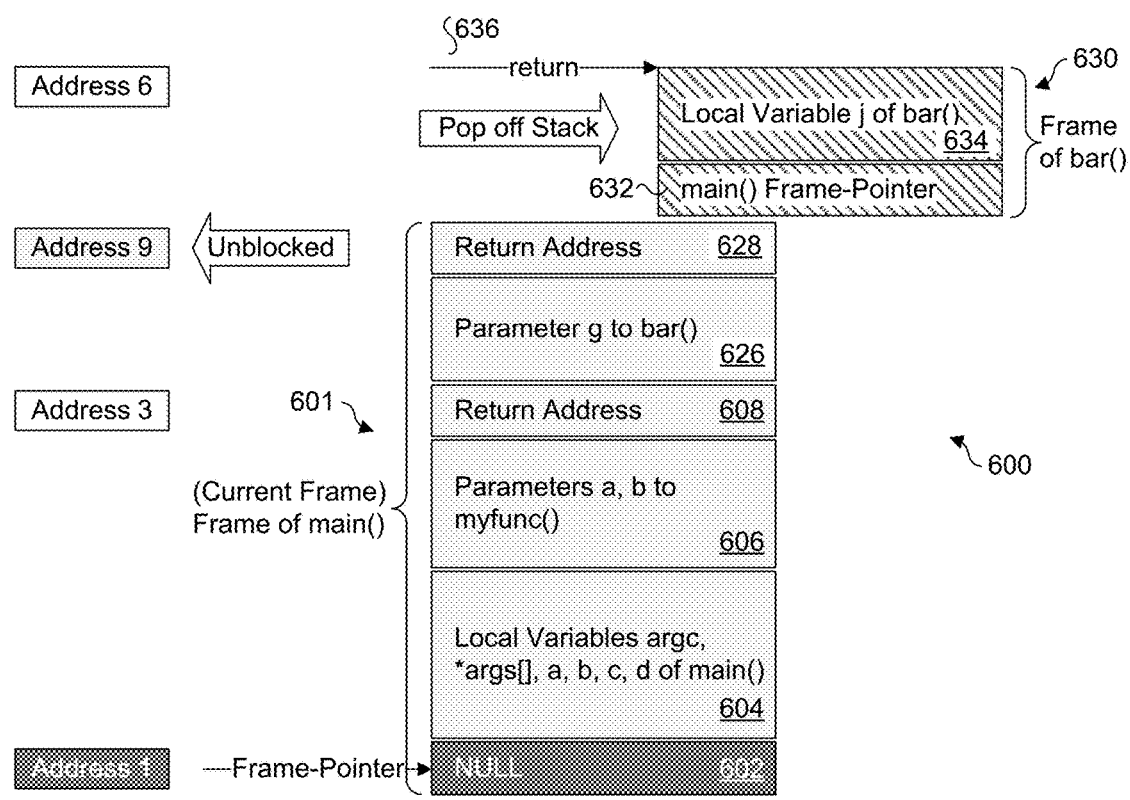

Function bar( ) is executed to completion at line 33, which returns execution of the main thread to function main( ) at line 7. As shown in FIG. 6g, this return is depicted as a return 636, which results in stack frame 630 being popped off of stack 600. The memory controller detects this as a proper return, and thus unblocks Address 9 corresponding to Return Address 628. Address 10 of previous frame-pointer 632 is removed from the frame-pointer linked list, and the current frame-pointer again points to Address 1, and stack frame 601 becomes the current frame.

Upon returning to main( ) execution continues from line 7 until the return(0) instruction at line 9. A return from main( ) results in the program exiting. From the perspective of the operating system, the user application has completed without error (a return(0) is commonly used to indicate an application has completed without error). As a result, the virtual memory regions that has been allocated to the user application is marked as free, making it available for use for other processes (e.g., other user applications). However, the memory controller has no knowledge that the application has ended at this point. Rather, the memory controller deciphers that the application has ended if it doesn't see any memory accesses to the physical memory region of interest for some predetermined time in combination with detecting that the frame-pointer linked list only has a single entry corresponding to the starting address for the stack frame.

As discussed above, memory locations corresponding to return address are marked as blocked until a proper return from a called function is detected. One of the attack vectors used by malicious code is to overwrite a return address value such that it points to a location in memory where a module of the malicious code resides. This results in the malicious code module being executed, which may results in significant damage to the host system. Embodiments herein prevent overwriting of return addresses in the manner through use of a secure memory controller, without requiring any changes to application code. Moreover, the secure memory controller scheme does not require any changes to any of the other hardware components in the host system, including no changes to memory nor any changes to the caches.

Also as discussed above, rather than inferring the location of stacks, corresponding stack location information may be provided by the processor to the memory controller. For example, when a new thread is launched, a corresponding stack is created in system memory. The location of this stack (address range in virtual memory) is known to the operating system, and this information is passed to the memory controller (either as the virtual address range or the translated physical address range. In one embodiment, stack location information is provided to the memory controller via the system memory agent.

Figure 5A:
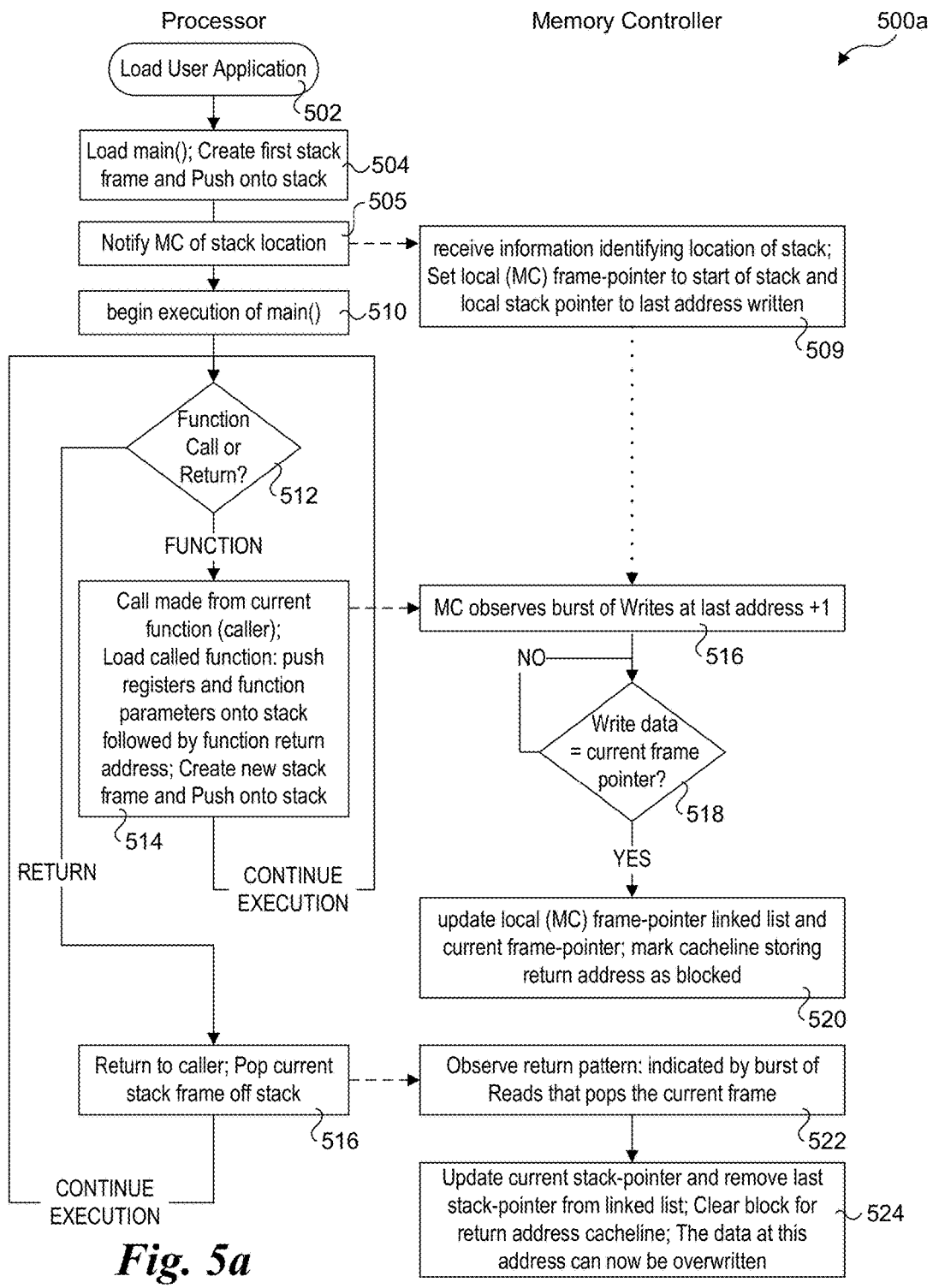
FIG. 5*a* is an augmented version of the flowchart of FIG. 5 in which information regarding the location of a stack is provided to the memory controller by the processor, according to one embodiment.

Flowchart 500a of FIG. 5a shows an augmented version of flowchart 500 configured to support providing stack location information to the memory controller. As before, the application is loaded in start block 502, and the main( ) function is loaded in block 504 and the main thread's stack frame is created and pushed onto the stack. In a block 505 the processor notifies the memory controller of the stack's location. This information is received by the memory controller in a block 509, which sets is local frame pointer to the start of the stack and the local stack pointer to the last address written, as before. Generally, the stack location information will include at least the starting address of the stack (either as a virtual address that is translated by the memory controller or as a physical address translated by the processor through the page translation facilities discussed herein). The stack location may also include the top address of the memory region allocated for the stack.

In addition to providing information regarding the stack location for a processes' main thread, similar operations to those shown in blocks 505 and 509 may be performed each time a thread is launched, including threads for both user applications and kernel operations. In the case of kernel operations, separate indicia may be provided to inform the controller that the stack is a kernel-mode stack.

Figure 7:
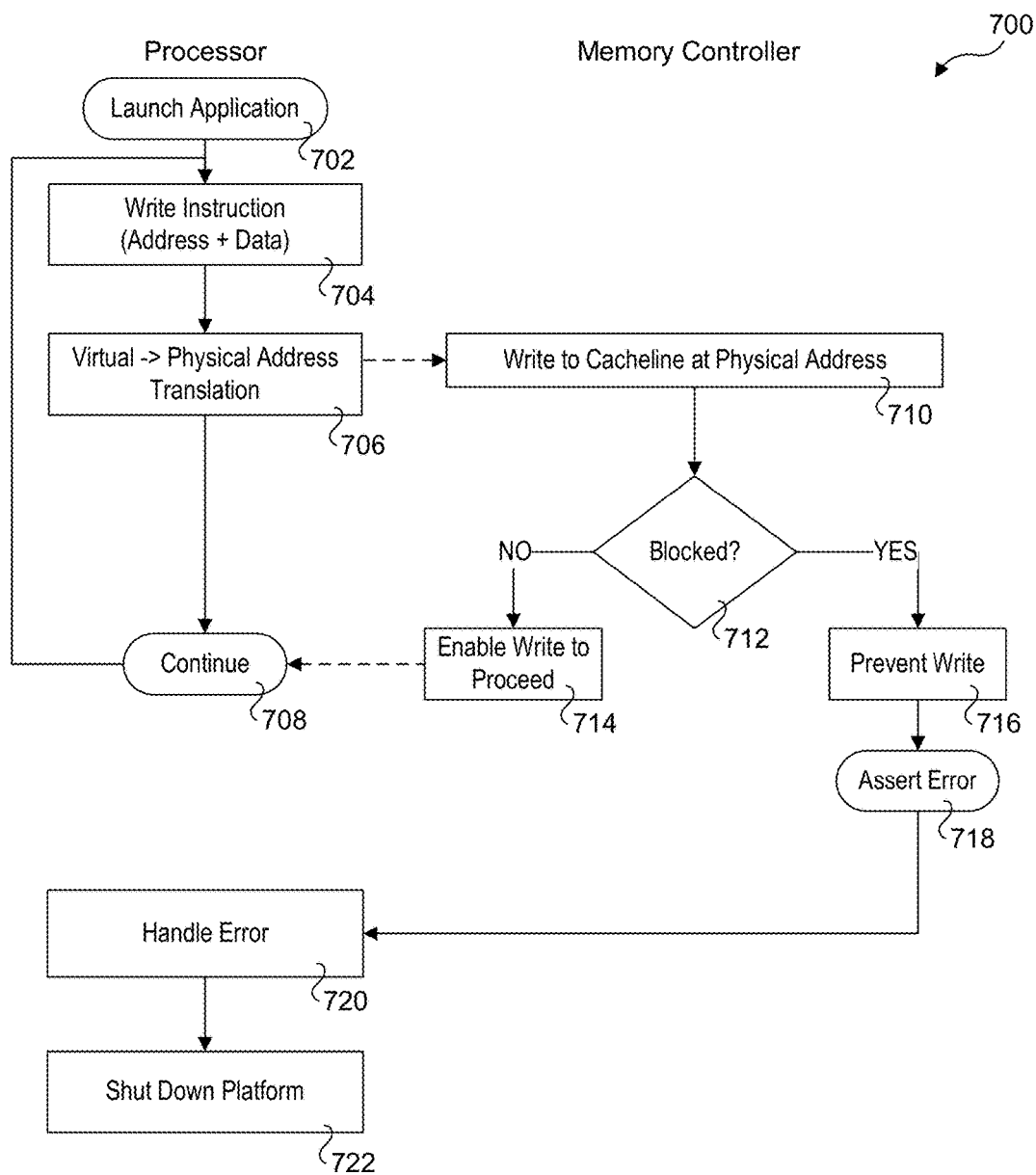
FIG. 7 is a flowchart illustrating operations and logic for implementing a secure return mechanism via a memory controller that prevents malicious code from overwriting return addresses, according to one embodiment.

Flowchart 700 of FIG. 7 illustrates operations and logic for implementing a secure return mechanism via a memory controller that prevents malicious code from overwriting return addresses, according to one embodiment. As with flowchart 500, flowchart 700 depicts operations performed by the processor and the memory controller. The process begins in a start block 702, which launches the application. The operations in blocks 704 and 706 and continue block 708 are then performed in an ongoing, loop-wise manner. In block 704 a write instruction is executed by the processor. Each write instruction will include an address to write to, along with the data to write. For simplicity, each write instruction in this example writes a single block of data at a corresponding memory address.

In a block 706, a virtual-to-physical address translation is performed, using a scheme such as described above. The result of the output of block 706 is a write of the data to a memory location at the translated physical address, as depicted in a block 710. In a decision block 712, the memory controller determines whether the memory location is blocked. If the answer is NO, the logic proceeds to a block 714 that enables the write to the memory location to proceed. If the memory location is blocked, the answer will be YES, resulting in the logic flowing to a block 716 that prevents the write to the memory location. An error is then asserted in a block 718. For example, various types of errors might be used, such as a Machine Check Architecture (MCA) error, or an error that could include one or more parameters that might provide information to what caused the error, such as the address at which offending malicious code attempted to overwrite. The error is handled in a block 720 by the processor. In the case of an MCA error, the system would be shutdown (or restarted) in a block 722.

A significant aspect of the foregoing scheme is that even though the controller does not explicitly know where/how big the frames are (or when calls/returns are happening), it can infer the frame beginning by checking all writes for the same value as its current frame-pointer (e.g., as described above for decision block 518). In one embodiment, every write value whose address is in the region of interest (e.g. reasonably close to the current frame address) will be checked to see if it equals the local frame-pointer. If so, then there is a very high probability of a new frame being written.

When the memory controller sees a write-burst pattern such as above, and sees a value in the right spot in the burst that corresponds to its local/predicted frame-pointer, it infers that a proper call has been made and updates its local frame-pointer. Then it may see further calls or returns, and it updates its local frame-pointer (and perhaps additional associated inferred data about the frame) accordingly.

By optionally recording the nature of the write-burst during a call, it can infer where the parameters are, their size, the local variables etc., and then check that these write bursts match up with the corresponding read bursts during return. Having detected the locations of the frames in the stack, it can thus ensure that the return-address field is not overwritten unless part of a legitimate call.

Paging Overview

As discussed above, modern computer systems employ complex multi-level page tables. The purpose of a page-table is to provide an indirection from the (per-process) virtual address space to a set of physical pages. This has a large number of advantages such as supporting a total virtual memory larger than the physical memory (pages are swapped to disk), but most importantly, being able to support different processes (per application) that are isolated from each other. This last feature enables supporting a large number of applications in a way that each application can only access the physical pages through its own page table mapping, thus providing excellent security. The system further expects that only the OS (kernel mode privilege execution context) can change the mappings for a process.

As discussed above, each time an executing thread accesses a page, the virtual address is translated by the hardware into a physical address. As part of this translation, permission bits are checked by the CPU hardware (e.g. if the current privilege is user-mode, but the page being requested has permission bits set to kernel-mode or another privileged-mode, a fault is generated). Unfortunately, malicious software can exploit subtle bugs in the OS, causing it to inadvertently change some permission bits to allow user-mode access to the page table structures.

Page Table Description

The page table takes the virtual page number for a process, and translates it to the corresponding physical page number. In the following description, a simplified flat paging system is discussed to illustrate the concepts; similar concepts apply to a multi-level paging system. In the simple flat table, the paging system employs an array of page table entries. This array is indexed by the virtual page number, and the corresponding entry has the physical page number. For instance, assume we have 32-bit virtual addresses, and 4 KB pages. Each 32-bit virtual address (VA) is considered to be a concatenation of Virtual page number (VPN) and offset within the page. A 4 KB page needs 12-bits to access a byte within the page, hence the offset will be 12 bits. Thus we have a 20-bit VPN, followed by a 12-bit offset. The VPN is the index into the flat page table array, which will return an entry that has the physical page number (PPN). The effective address formed will thus be PPN || offset. The PPN can also be 20-bits (but often can be different from the VPN size).

An exemplary PPN entry 800 is shown in FIG. 8. Depending on the CPU architecture, different meta-data bits will be present, but PPN entry 800 shows a minimal set of meta-data bits. Field 804 contains a present bit 'P', which indicates whether the page is in memory or swapped to a disk. Fields 806, 808, and 810 respectively contain the 'R', 'W', and 'X' bits, which indicate whether the entity attempting to access this page has read/write/execute permissions for this page (e.g. code pages are the only ones that should have 'X' permissions, some pages need to be ensured to be read-only). The 'U/S' bit in field 812 is critical—it specifies whether the page may be accessed from user mode or supervisor mode (this is the one that is the prime target of attacks). The 'A' bit in field 814 indicates whether the page has been accessed (useful to determine which pages to swap out), while the 'D' bit in field 816 indicates whether the page is dirty (i.e. written and in a new/different state from the copy on disk).

Page Table Property Checking

Figure 9:
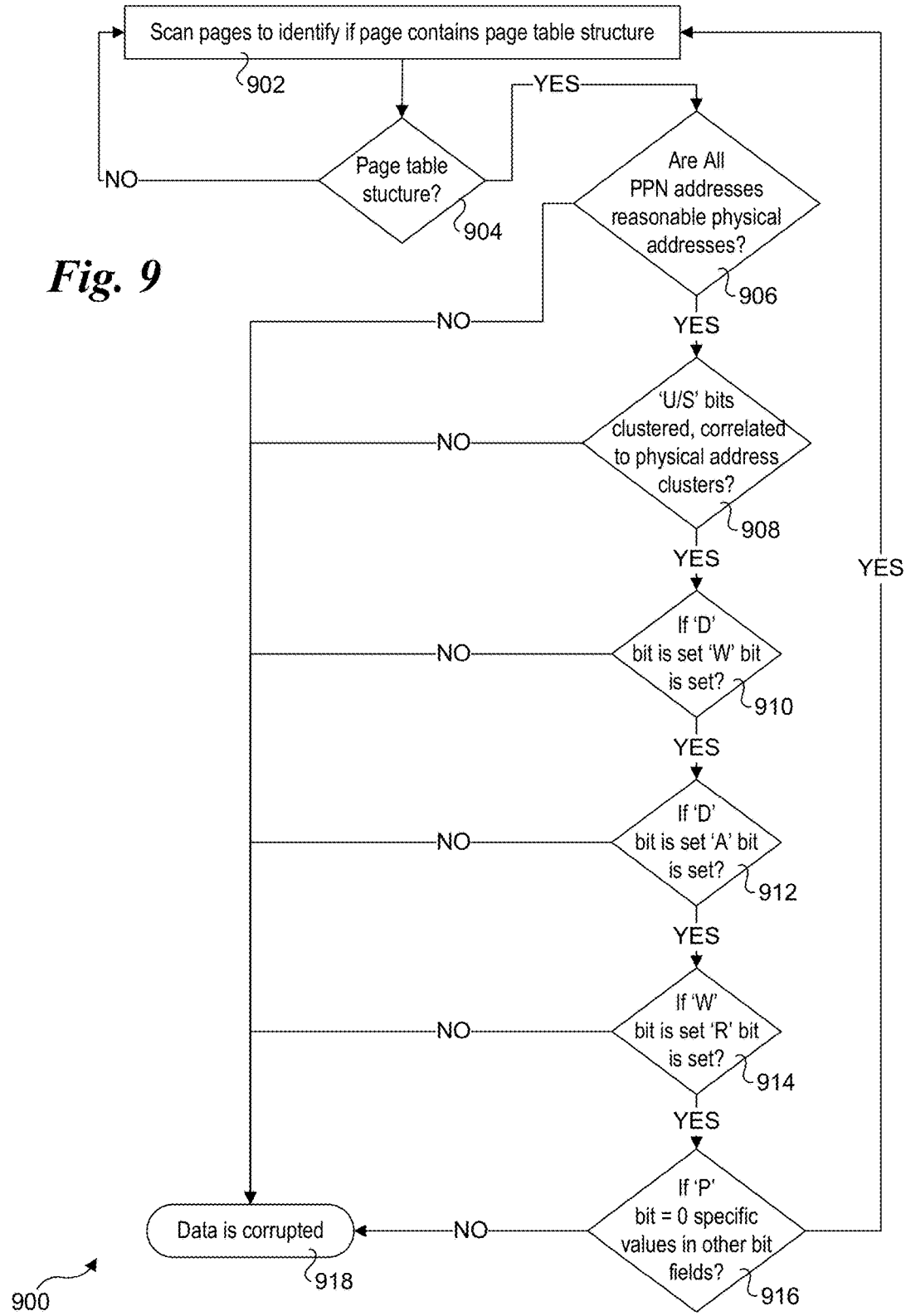
FIG. 9 is a flowchart illustrating operations and logic for detecting page table entries that have been corrupted by malicious code.

The entry shown in FIG. 8 is a 32-bit entry, and thus each (4 KB) page of the page-table structure will hold 1K entries. Scanning a page can reveal if the page is part of a page-table structure with high probability, or to check and ensure that it stays uncorrupted. A flowchart illustrating one embodiment of a page table property checking scheme is shown in FIG. 9.

In a block 902 pages are scanned to identify whether a page contains a page table structure (e.g., contains PTEs). In a decision block 904 a determination whether the page includes a page table structure. If the answer is YES, the logic proceeds to a decision block 906. If the answer is NO, the logic loops back to block 902 to scan additional pages, with the operations of block 902 and decision block 904 performed on repeated basis.

Decision block 906 is the beginning of a set of property/data checks, as depicted by additional decision blocks 908, 910, 912, 914 and 916. As illustrated, if the answer is YES for decision blocks 906, 908, 910, 912, and 914, the logic proceeds to the next decision block in the sequence. Conversely, if the answer of the any of decision blocks 906, 908, 910, 912, 914 and 916 is NO, the logic proceeds to an exit block in which it has been determined that the page data is corrupted.

In decision block 906, a determination is made to whether all the PPN addresses seem like reasonable physical addresses (e.g. expected to be clustered close together, since they would have been allocated in bursts). In decision block 908 a check is made to verify the 'U/S' bits are clustered in a manner that is correlated to the physical address clusters. In decision block 910 a check is made to determine if any 'D' bit is set the 'W' bit for the same PTE is also set. Similarly, in block 912 a check is made to determine if any 'D' bit is set the 'A' bit for the same PTE is also set. In block 914 a check is made to determine if any 'W' bit is set the 'R' bit for the same PTE is also set.

In addition to checking individual bit fields, there are predetermined patterns that are expected under certain instances. For example, if the 'P' bit is 0, the page has been swapped to disk. As a result, the value for each of the other bit fields is '0' in one embodiment. A corresponding check is made in decision block 916. If the 'P' bit is 0 and one of the other bit fields is '1' then the answer to decision block 916 is NO, and the logic proceeds to exit block 918. Otherwise, if the answer is YES, the logic loops back to block 902, and the process is repeated.

Figure 10:
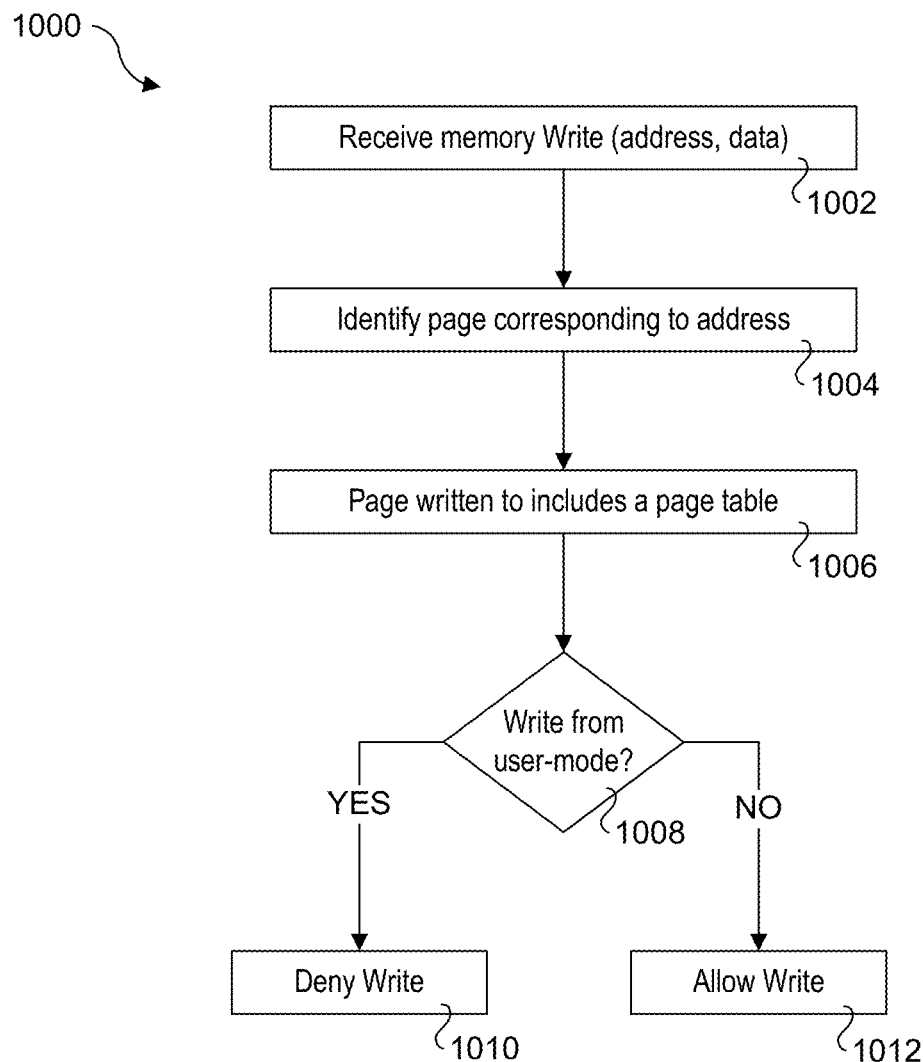
FIG. 10 is a flowchart illustrating operations and logic for preventing access to page table entries from user-mode.

Several variations are possible based on the target architecture. The controller can check if a page being written to is a page-table entry, and then ensure no access to the page table entry while operating in user-mode. A flowchart 1000 illustrating operations and logic for implementing this check, according to one embodiment, is shown in FIG. 10.

Flowchart 1000 begins in a block 1002, with the memory controller receiving a memory write request, which will include the address of the memory location to write to and the data to be written. In a block 1004, the page corresponding to the address is identified using in address translation scheme such as discussed above. In a block 1006 it is determined that the page to be written to includes a page table containing page table entries. In a decision block 1008 a check is made to determine whether the write is from a user-mode process. If the answer is YES, the write is denied in a block 1010, as uncorrupted user-mode processes do not (and are not permitted to) modify page tables or their PTEs. If the write is not from user-mode (i.e., from privileged-mode), the write is allowed, as depicted by a block 1012.

There are various ways that the memory controller can determine whether the write is from a user-mode process. For example, depending on the CPU architecture and the OS/software implementation, a separate kernel stack region may be used. In one embodiment the memory controller can infer the location of the kernel stacks, and ensure that when page tables are being accessed, it has seen recent activity on a kernel stack (such as some writes to indicate a call into kernel space). Alternatively in some systems, a switch to kernel mode may result in a predictable burst of writes to save all CPU state (e.g., XSAVE in x86). This burst activity may be detected by the memory controller to ascertain the current processor mode is kernel-mode.

As another check, the controller can track recent pages whose permissions were changed and monitor them.

One hallmark of privilege attacks is to gain access to a page that has PTEs and then change the mappings to other physical pages (owned by other processes). The memory controller can detect that a mapping is being changed, and check whether the new physical page is OK. For example, in one embodiment a check is made to other process mappings to ensure this page is OK or unused, or there is or there is explicit permission to share such a page in the other process table—generally, the particular check(s) available will depend on the target CPU architecture. The controller can also check to see if a page that has PTEs is repeatedly getting remapped to different physical pages, and each time the physical page is being read (scanned for "interesting data").

Figure 11:
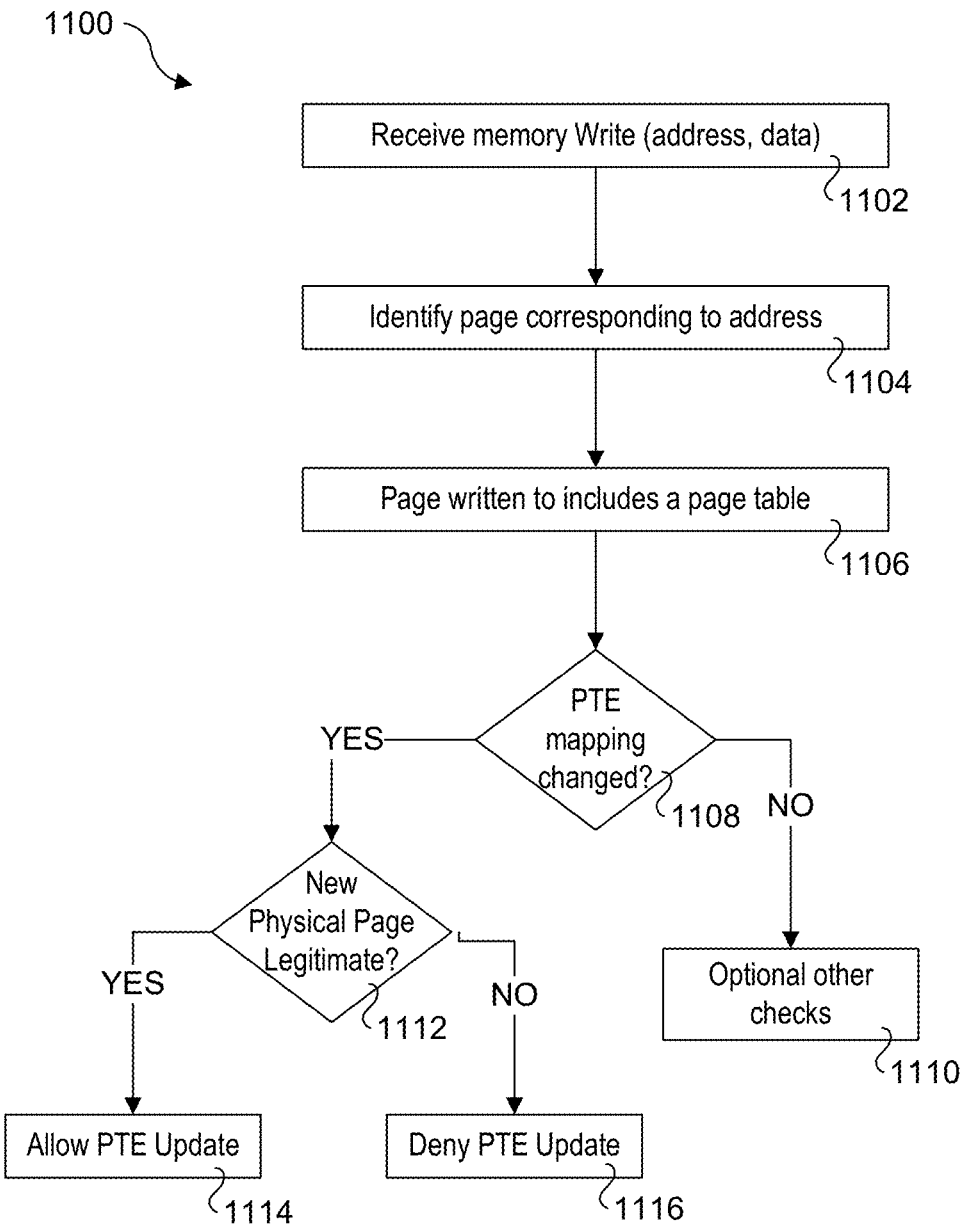
FIG. 11 is a flowchart illustrating operations and logic performed by the memory controller associated with changes in page table entry mappings.

FIG. 11 shows a flowchart 1100 illustrating operations and logic for implementing the foregoing functionality, according to one embodiment. The operations of blocks 1102, 1104, and 1106 are analogous to respective operations in blocks 1002, 1004, and 1006 described above for flowchart 1000. In a decision block 1108 a determination is made to whether the write will result in a PTE mapping change. If the answer is NO, the logic proceeds to block 1112 in which optional other checks are performed.

If the answer to decision block 1108 is YES, the logic proceeds to a decision block 1112 to determine whether the new physical page is legitimate. For example, the memory controller may scan the new page to verify it is properly formed. If the new page is determined to be legitimate the update to effect the PTE mapping change is allowed in a block 1114. If it is not, the update is denied in a block 1116.

One class of attacks that is used by malicious code is a bit-flipping attack. Bit-flipping attacks usually cannot precisely flip just the target bit (e.g., a 'U/S' bit for a given PTE) but will inadvertently flip some neighboring bits, as well. Checking a list of properties such as described above, can thwart this class of attacks.

Figure 12:
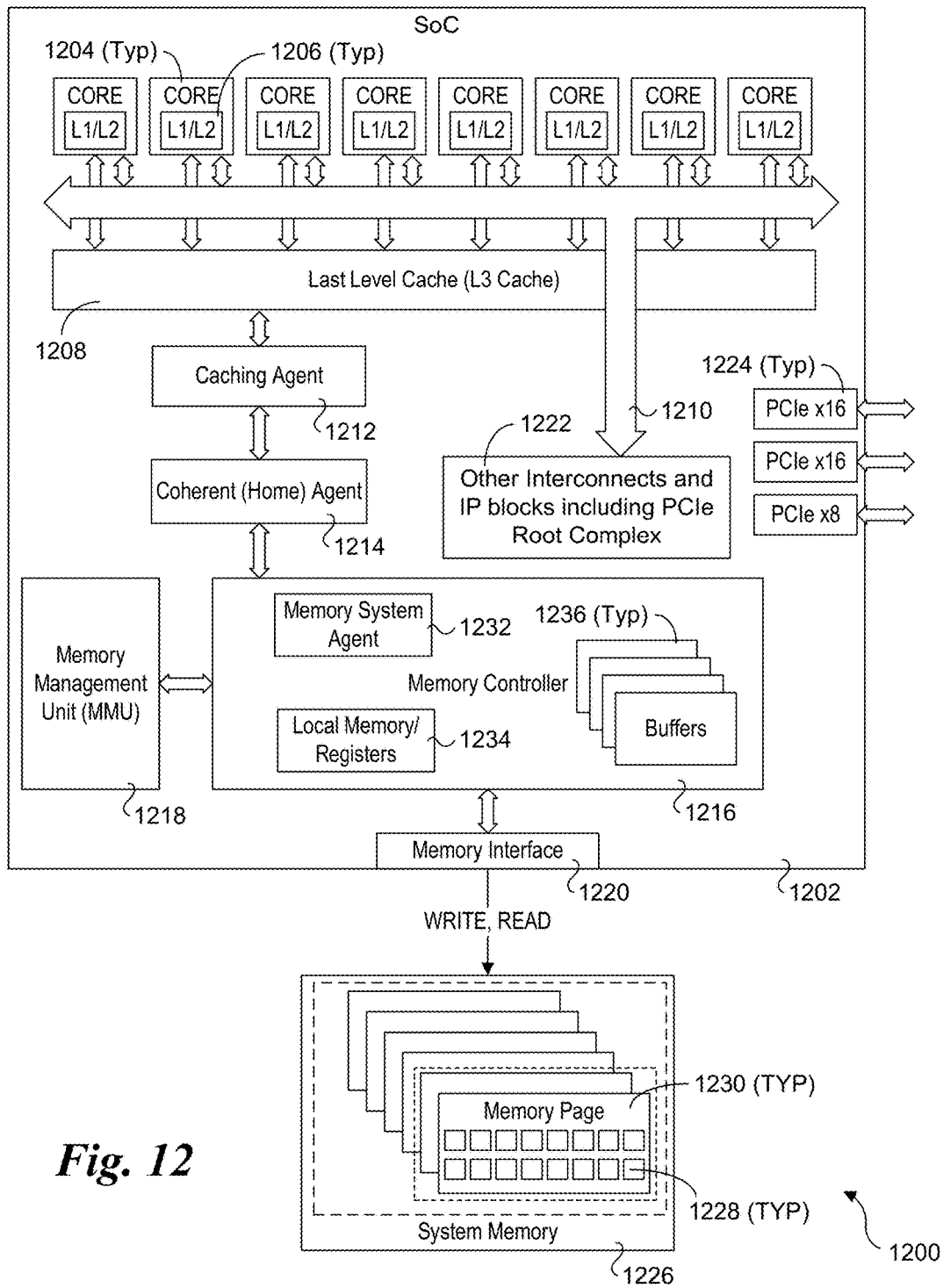
FIG. 12 is a schematic diagram of a computer system architecture including a secure memory controller integrated in a processor.

Aspects of the functionality, operations, and logic illustrated by the embodiments of the memory controllers described herein may be implemented in a stand-alone memory controller, a memory controller that is part of a chipset that includes a separate processor, or integrated with processor core elements as part of a System on a Chip (SoC) processor or otherwise implemented on a processor. An exemplary processor SoC 1202 including a secure memory controller is shown in system 1200 of FIG. 12.

SoC 1202 includes a plurality of processor cores 1204, each including a local level 1 (L2) and level 2 (L2) cache (depicted as L1/L2 caches 1206) and coupled to a shared level 3 (L3) cache comprising a last level cache 1208 via an interconnect 1210. SoC 1202 further includes a caching agent 1212, a coherent (home) agent 1214, a memory controller 1216, a memory management unit 1218, and a memory interface 1220. In addition, a processor SoC would generally include other types of Intellectual Property (IP) blocks and interconnects, such as IP blocks relating to Input-Output (10) interfaces. For simplicity, these are collectively shows as a block 1222. In one embodiment, the IP blocks include a Peripheral Component Interconnect Express (PCIe) root complex that is coupled to an PCIe interconnect hierarchy including multiple PCIe interfaces 1224.

Memory interface 1220 is coupled to system memory 1226, which is partitioned into a plurality of memory pages 1228, each including multiple cachelines 1230. System memory may be physically implemented in various form factors, such as but not limited to DIMMs and single in-line memory modules (SIMMS). Memory interface 1220 may support one or more memory channels configured to interface with various types of memory such as but not limited to DDR3 and DDR4 memory.

Memory controller 1216 includes a memory system agent 1232, local memory and registers 1234, and buffers 1236. In one embodiment, the logic for implementing the secure memory controller functionality described herein is implemented via embedded circuitry and logic associated with memory system agent 1232. Optionally, all or a portion of the functionality may be implemented in a separate block of logic (not shown). In addition, memory system agent 1232 communicates with coherent agent 1224 to facilitate coherent memory transactions using well-known memory coherency techniques.

In one embodiment data relating to stacks and page tables is stored in corresponding data structures in local memory/registers 1234. Generally, the local memory on a memory controller will be a very high-speed memory similar to that used by the L1 and L2 caches. Local memory/registers 1234 may include various types of registers used to store data. In one embodiment, the previous frame-pointer link lists are stored in local memory, while a separate copy of the current frame-pointers for all threads (or groups of threads) are stored arrays. In one embodiment, user-mode threads and kernel-mode (or privilege-mode) threads are stored in separate data structures. Optionally, all or a portion of the current frame-pointers may be stored in registers. In one embodiment the registers are configured to facilitate data comparison using a parallel bit compare scheme. This enables the data for a given memory write to be compared to multiple current frame-pointers in parallel to detect for a match. In one embodiment, a hashing scheme is used for quickly performing matches with current frame-pointers that are stored in one or more data structures in the memory controller's local memory.

Further aspects of the subject matter described herein are set out in the following numbered clauses:

1. A method performed by a memory controller, comprising:
controlling access to system memory, the accesses including memory writes and memory reads;
monitoring patterns of accesses to the system memory;
detecting a return address for a function call in the system memory; and
preventing the return address from being overwritten unless the memory controller determines it is safe.

2. The method of clause 1, further comprising operations performed by the memory controller including:
monitoring bursts of writes to the system memory, the burst of writes corresponding to function calls from an execution thread;
detecting that a new stack frame corresponding to a called function is added to a stack for the execution thread, the new stack frame beginning with a frame pointer; and
updating a current frame-pointer for the stack to the frame-pointer for the new stack frame.

3. The method of clause 2, further comprising operations performed by the memory controller including:
implementing a linked list of frame-pointers, the linked list including a first frame-pointer; and
when a new stack frame is detected to be added to the stack, appending a frame pointer for the new stack frame to the end of the linked list, wherein each frame-pointer except the first frame-pointer is a previous frame-pointer that that points to the frame pointer preceding it in the linked list.

4. The method of clause 3, further comprising operations performed by the memory controller including:
detecting that a stack frame has been popped off of the stack for the execution thread;
removing the frame-pointer corresponding to the stack frame that is detected to have been popped off of the stack from the end of the linked list; and
setting the frame-pointer that is now at the end of the linked list as the current frame-pointer.

5. The method of clause any of clauses 2-4, further comprising operations performed by the memory controller including:
identifying a location in the stack containing a return address for called function; and
preventing the location from being overwritten until the called function has properly returned to the return address.

6. The method of clause 5, wherein the location in the stack containing the return address for the called function is a memory location having an address in the system memory, further comprising operations performed by the memory controller including:
blocking the memory location from being overwritten;
observing a pattern comprising a burst of reads to the system memory;
detecting that an address for one of the reads in the burst of reads is the address for the memory location; and
unblocking the memory location to allow the memory location to be overwritten.

7. The method of clause 5, wherein the location in the stack containing the return address for the called function is a memory location having an address in the system memory, further comprising operations performed by the memory controller including:

blocking the memory location from being overwritten;

detecting, while the memory location is blocked, a write access having an address for the memory location;

determining the write access is unsafe; and asserting an error to cause execution of the thread to halt.

8. The method of any of clauses 2-7, wherein each memory write includes an address and data further comprising operations performed by the memory controller including:

storing a current frame-pointer for the stack, the current frame pointer having a data value that points to the location in a system memory physical address space of a current stack frame for the stack;

for each write in a burst of writes, comparing the data in the write with the data value for the current frame-pointer; and if the data matches the data value for the current frame-pointer, identifying the memory write as the frame-pointer for a new stack frame.

9. The method of any of the preceding clauses, further comprising operations performed by the memory controller including:

receiving information identifying a memory region in system memory allocated for a new stack; and creating a new local frame pointer, a new local stack pointer, and a linked list of previous frame pointers for use with memory accesses performed by an execution thread associated with the new stack.

10. The method of any of the preceding clauses, further comprising operations performed by the memory controller including:

detecting a start of a memory region in the system memory allocated for a new stack; and creating a new local frame pointer, a new local stack pointer, and a linked list of previous frame pointers for use with memory accesses performed by an execution thread associated with the new stack.

11. The method of any of the preceding clauses, further comprising operations performed by the memory controller that prevent malicious code from overwriting page table entries in the system memory.

12. The method of any of the preceding clauses, wherein the memory controller is integrated in a processor including a user-mode of execution and a privileged-mode of execution, each execution thread being executed by the processor being executed in one of the user-mode and privileged-mode, the method further comprising operations performed by the memory controller including:

permitting page table entries to be written to the system memory via threads executing in privileged-mode; and preventing page table entries from being written to the system memory via threads executing in the user-mode.

13. The method of any of the preceding clauses, further comprising operations performed by the memory controller including:

scanning memory pages in the system memory to identify if a memory page contains a page table structure; and for a memory page containing a page table structure including a plurality of page table entries;

checking bit fields in the page table entries to determine whether a page table entry has been corrupted.

14. The method of clause 13, further comprising operations performed by the memory controller including:

detecting that a memory write will result in a change to a patent table entry (PTE) mapping;

determining if a new page corresponding to the PTE mapping is legitimate; and if the new page is determined to be legitimate, allowing the change to the PTE to proceed, otherwise preventing the change to the PTE.

15. An apparatus, configured to interface with system memory when installed in a computer system including system memory, comprising:

a memory controller including circuitry and logic configure to, receive memory access requests comprising write and read accesses for writing to and reading from the system memory, each write and read access including an address in an address space for the system memory;

monitor patterns of accesses to the system memory;

identify, via observation of access patterns to the system memory, regions of memory to protect write access from malicious code;

detect, based on observed memory access patterns, a memory write access request to a region of memory to be protected from malicious code; and detect whether the memory write access request is unsafe, and if it is, denying the write access request, otherwise, allowing the write access request to proceed.

16. The apparatus of clause 15, wherein the memory controller includes at least one of local memory and a plurality of registers and the circuitry and logic in the memory controller is further configured to:

monitor bursts of writes to the system memory, the burst of writes corresponding to function calls from an execution thread executing on a processor core in the computer system;

detect that a new stack frame corresponding to a called function is added to a stack maintained in system memory for the execution thread, the new stack frame beginning with a frame-pointer; and store a local current frame-pointer for the stack in the local memory or a register; and update the local current frame-pointer for the stack to the frame-pointer for the new stack frame.

17. The apparatus of clause 16, wherein the circuitry and logic in the memory controller is further configured to:

implement a linked list of frame-pointers in the local memory, the linked list including a first frame-pointer; and when a new stack frame is detected to be pushed on the stack, append a frame-pointer for the new stack frame to the end of the linked list, wherein each frame-pointer in the linked list except the first frame-pointer is a previous frame-pointer that that points to the frame pointer preceding it in the linked list.

18. The apparatus of clause 17, wherein the circuitry and logic in the memory controller is further configured to:

detect that a stack frame has been popped off of the stack for the execution thread;

remove the frame-pointer corresponding to the stack frame that is detected to have been popped off of the stack from the end of the linked list; and update the local current frame-pointer to the frame-pointer that is now at the end of the linked list.

19. The apparatus of any of clauses 16-18, wherein the circuitry and logic in the memory controller is further configured to:

identify a location in the stack containing a return address for the called function; and prevent data in system memory at an address corresponding to the location from being overwritten until execution of the called function has properly returned to the return address.

20. The apparatus of clause 19, wherein the location in the stack containing the return address for the called function is a memory location having an address in the system memory, and wherein the circuitry and logic in the memory controller is further configured to:
block the memory location from being overwritten;
observe an access pattern comprising a burst of reads to the system memory;
detect that an address for one of the reads in the burst of reads is the address for the memory location; and
unblock the memory location to allow the memory location to be overwritten.

21. The apparatus of clause 19 or 20, wherein the location in the stack containing the return address for the called function is a memory location having an address in the system memory, and wherein the circuitry and logic in the memory controller is further configured to:
block the memory location from being overwritten;
detect, while the memory location is blocked, a write access having an address for the memory location;
determine the write access is unsafe; and
assert an error.

22. The apparatus of any of clauses 15-21, wherein the circuitry and logic in the memory controller is further configured to:
receive information identifying a memory region in system memory allocated for a new stack; and
create a new local frame pointer, a new local stack pointer, and a linked list of previous frame pointers for use with memory accesses performed by an execution thread associated with the new stack.

23. The apparatus of any of clauses 15-22, wherein the circuitry and logic in the memory controller is further configured to:
detect a start of a memory region in the system memory allocated for a new stack; and
create a new local frame pointer, a new local stack pointer, and a linked list of previous frame pointers for use with memory accesses performed by an execution thread associated with the new stack.

24. The apparatus of any of clauses 15-23, wherein during operation of the computer system an operating system accesses and modifies a memory page table containing a plurality of page table entries and the circuitry and logic in the memory controller is further configured to prevent malicious code from overwriting page table entries.

25. The apparatus of clause 24, wherein the memory controller is integrated in a processor including a user-mode of execution and a privileged-mode of execution, each execution thread being executed by the processor being executed in one of the user-mode and privileged-mode, and wherein the circuitry and logic in the memory controller is further configured to:
permit page table entries to be written to the system memory via threads executing in privileged-mode; and
prevent page table entries from being written to the system memory via threads executing in the user-mode.

26. The apparatus of any of clauses 15-25, wherein the memory controller includes at least one of local memory and a plurality of registers and the circuitry and logic in the memory controller is further configured to:
scan memory pages in the system memory to identify if a memory page contains a page table structure; and
for a memory page containing a page table structure including a plurality of page table entries,
checking bit fields in the page table entries to determine whether a page table entry has been corrupted.

27. The apparatus of any of clauses 15-26, wherein the apparatus is a processor further comprising:
a plurality of processor cores, each including a local level 1 (L1) and level 2 (L2) cache and coupled to an interconnect; and
a last level cache, coupled to the interconnect,
wherein the memory controller is operatively coupled to the last level cache.

28. A system comprising:
system memory having an address space;
a processor including,
a plurality of processor cores, each including a local level 1 (L1) and level 2 (L2) cache and coupled to an interconnect;
a last level cache, coupled to the interconnect;
system memory;
a memory controller, operative coupled to the last level cache and including an interface coupled to system memory, including circuitry and logic configure to,
receive memory access requests comprising write and read accesses for writing to and reading from the system memory, each write and read access including an address in the system memory;
monitor patterns of accesses to the system memory;
identify, via observation of access patterns to the system memory, regions of memory to protect write access from malicious code;
detect, based on observed memory access patterns, a memory write access request to a region of memory to be protected from malicious code; and
detect whether the memory write access request is unsafe, and if it is, denying the write access request,
otherwise, allowing the write access request to proceed.

29. The system of clause 28, wherein the memory controller includes at least one of local memory and a plurality of registers and the circuitry and logic in the memory controller is further configured to:
monitor bursts of writes to the system memory, the burst of writes corresponding to function calls from an execution thread executing on a processor core in the computer system;
detect that a new stack frame corresponding to a called function is added to a stack maintained in system memory for the execution thread, the new stack frame beginning with a frame-pointer;
identify a location in the stack containing a return address for the called function; and
prevent data in system memory at an address corresponding to the location from being overwritten until execution of the called function has properly returned to the return address, wherein proper return of the of the called function is detected by observing a burst of reads corresponding to the new stack frame being pushed off of the stack.

30. The system of clause 29, wherein the circuitry and logic in the memory controller is further configured to:
implement a linked list of frame-pointers in the local memory, the linked list including a first frame-pointer; and
when a new stack frame is detected to be pushed on the stack, append a frame-pointer for the new stack frame to the end of the linked list,
wherein each frame-pointer in the linked list except the first frame-pointer is a previous frame-pointer that that points to the frame pointer preceding it in the linked list.

31. The system of clause 30, wherein the circuitry and logic in the memory controller is further configured to:
  detect that a stack frame has been popped off of the stack for the execution thread;
  remove the frame-pointer corresponding to the stack frame that is detected to have been popped off of the stack from the end of the linked list; and
  update the local current frame-pointer to the frame-pointer that is now at the end of the linked list.

32. The system of any of clauses 29-31, wherein the circuitry and logic in the memory controller is further configured to:
  identify a location in the stack containing a return address for the called function; and
  prevent data in system memory at an address corresponding to the location from being overwritten until execution of the called function has properly returned to the return address.

33. The system of clause 32, wherein the location in the stack containing the return address for the called function is a memory location having an address in the system memory, and wherein the circuitry and logic in the memory controller is further configured to:
  block the memory location from being overwritten;
  observe an access pattern comprising a burst of reads to the system memory;
  detect that an address for one of the reads in the burst of reads is the address for the memory location; and
  unblock the memory location to allow the memory location to be overwritten.

34. The system of clause 32 or 33, wherein the location in the stack containing the return address for the called function is a memory location having an address in the system memory, and wherein the circuitry and logic in the memory controller is further configured to:
  block the memory location from being overwritten;
  detect, while the memory location is blocked, a write access having an address for the memory location;
  determine the write access is unsafe; and
  assert an error.

35. The system of any of clauses 28-34, wherein the circuitry and logic in the memory controller is further configured to:
  receive information identifying a memory region in system memory allocated for a new stack; and
  create a new local frame pointer, a new local stack pointer, and a linked list of previous frame pointers for use with memory accesses performed by an execution thread associated with the new stack.

36. The system of any of clauses 28-35, wherein the circuitry and logic in the memory controller is further configured to:
  detect a start of a memory region in the system memory allocated for a new stack; and
  create a new local frame pointer, a new local stack pointer, and a linked list of previous frame pointers for use with memory accesses performed by an execution thread associated with the new stack.

37. The system of any of clauses 28-36, wherein during operation of the system an operating system accesses and modifies a memory page table containing a plurality of page table entries and the circuitry and logic in the memory controller is further configured to prevent malicious code from overwriting page table entries.

38. The system of clause 37, wherein the processor includes a user-mode of execution and a privileged-mode of execution, each execution thread being executed by the processor being executed in one of the user-mode and privileged-mode, and wherein the circuitry and logic in the memory controller is further configured to:
  permit page table entries to be written to the system memory via threads executing in privileged-mode; and
  prevent page table entries from being written to the system memory via threads executing in the user-mode.

39. The system of any of clauses 28-38, wherein the memory controller includes at least one of local memory and a plurality of registers and the circuitry and logic in the memory controller is further configured to:
  scan memory pages in the system memory to identify if a memory page contains a page table structure; and
  for a memory page containing a page table structure including a plurality of page table entries,
  checking bit fields in the page table entries to determine whether a page table entry has been corrupted.

40. An apparatus, configured to interface with system memory when installed in a computer system including system memory, the apparatus including a memory controller having means for:
  receiving memory access requests comprising write and read accesses for writing to and reading from the system memory, each write and read access including an address in an address space for the system memory;
  monitoring patterns of accesses to the system memory;
  identifying, via observation of access patterns to the system memory, regions of memory to protect write access from malicious code;
  detecting, based on observed memory access patterns, a memory write access request to a region of memory to be protected from malicious code; and
  detecting whether the memory write access request is unsafe, and if it is, denying the write access request,
  otherwise, allowing the write access request to proceed.

41. The apparatus of clause 40, wherein the memory controller includes at least one of local memory and a plurality of registers and memory further includes means for:
  monitoring bursts of writes to the system memory, the burst of writes corresponding to function calls from an execution thread executing on a processor core in the computer system;
  detecting that a new stack frame corresponding to a called function is added to a stack maintained in system memory for the execution thread, the new stack frame beginning with a frame-pointer; and
  storing a local current frame-pointer for the stack in the local memory or a register; and
  updating the local current frame-pointer for the stack to the frame-pointer for the new stack frame.

42. The apparatus of clause 41, wherein the memory controller further includes means for:
  implementing a linked list of frame-pointers in the local memory, the linked list including a first frame-pointer; and
  when a new stack frame is detected to be pushed on the stack, appending a frame-pointer for the new stack frame to the end of the linked list,
  wherein each frame-pointer in the linked list except the first frame-pointer is a previous frame-pointer that that points to the frame pointer preceding it in the linked list.

43. The apparatus of clause 42, wherein the memory controller further includes means for:
  detecting that a stack frame has been popped off of the stack for the execution thread;

removing the frame-pointer corresponding to the stack frame that is detected to have been popped off of the stack from the end of the linked list; and updating the local current frame-pointer to the frame-pointer that is now at the end of the linked list.

44. The apparatus of any of clauses 41-43, wherein the memory controller further includes means for:

identifying a location in the stack containing a return address for the called function; and preventing data in system memory at an address corresponding to the location from being overwritten until execution of the called function has properly returned to the return address.

45. The apparatus of clause 44, wherein the location in the stack containing the return address for the called function is a memory location having an address in the system memory, and wherein the memory controller further includes means for:

blocking the memory location from being overwritten;

observing an access pattern comprising a burst of reads to the system memory;

detecting that an address for one of the reads in the burst of reads is the address for the memory location; and unblocking the memory location to allow the memory location to be overwritten.

46. The apparatus of clause 44 or 45, wherein the location in the stack containing the return address for the called function is a memory location having an address in the system memory, and wherein the memory controller further includes means for:

blocking the memory location from being overwritten;

detecting, while the memory location is blocked, a write access having an address for the memory location;

determining the write access is unsafe; and asserting an error.

47. The apparatus of any of clauses 40-46, wherein the memory controller further includes means for:

receiving information identifying a memory region in system memory allocated for a new stack; and creating a new local frame pointer, a new local stack pointer, and a linked list of previous frame pointers for use with memory accesses performed by an execution thread associated with the new stack.

48. The apparatus of any of clauses 40-47, wherein the memory controller further includes means for:

detecting a start of a memory region in the system memory allocated for a new stack; and creating a new local frame pointer, a new local stack pointer, and a linked list of previous frame pointers for use with memory accesses performed by an execution thread associated with the new stack.

49. The apparatus of any of clauses 40-48, wherein during operation of the computer system an operating system accesses and modifies a memory page table containing a plurality of page table entries and the memory controller further includes means for preventing malicious code from overwriting page table entries.

50. The apparatus of clause 49, wherein the memory controller is integrated in a processor including a user-mode of execution and a privileged-mode of execution, each execution thread being executed by the processor being executed in one of the user-mode and privileged-mode, and wherein the memory controller further includes means for:

permitting page table entries to be written to the system memory via threads executing in privileged-mode; and preventing page table entries from being written to the system memory via threads executing in the user-mode.

51. The apparatus of any of clauses 40-50, wherein the memory controller includes at least one of local memory and a plurality of registers and wherein the memory controller further includes means for:

scanning memory pages in the system memory to identify if a memory page contains a page table structure; and for a memory page containing a page table structure including a plurality of page table entries, checking bit fields in the page table entries to determine whether a page table entry has been corrupted.

52. The apparatus of any of clauses 40-51, wherein the apparatus is a processor further comprising:

a plurality of processor cores, each including a local level 1 (L1) and level 2 (L2) cache and coupled to an interconnect; and a last level cache, coupled to the interconnect, wherein the memory controller is operatively coupled to the last level cache.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding circuitry and logic embedded in the memory controller (i.e., embedded logic). The embedded logic may be implemented via hard-wired program logic, rewritable hardware logic (e.g., such as implemented for Field Programmable Gate Arrays (FPGA), or may comprise software and/or firmware executed by an embedded processor or the like. As used in the claims, the terminology circuitry and logic refers to various types of embedded logic, including hardwired logic, and programmable logic. Moreover, in the context of embedded logic implemented via an embedded processor, the circuitry corresponds to the embedded processor circuitry, and the logic corresponds to the software/firmware the runs on the embedded processor.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed by a memory controller implemented as part of a coherent memory architecture employing multiple levels of caches, comprising:
controlling access to system memory, the accesses including memory writes and memory reads;
monitoring patterns of accesses to the system memory, including monitoring bursts of writes to the system memory, the bursts of writes corresponding to function calls from an execution thread written to sequential address; detecting that a new stack frame corresponding to a called function is added to a stack for the execution thread, the new stack frame beginning with a frame pointer; updating a current frame-pointer for the stack to the frame-pointer for the new stack frame;
detecting a return address for a function call in the system memory; and
preventing the return address from being overwritten unless the memory controller determines overwriting the return address is safe.

2. The method of claim 1, further comprising operations performed by the memory controller including:
implementing a linked list of frame-pointers, the linked list including a first frame-pointer; and
when a new stack frame is detected to be added to the stack, appending a frame pointer for the new stack frame to the end of the linked list,
wherein each frame-pointer except the first frame-pointer is a previous frame-pointer that points to the frame pointer preceding it in the linked list.

3. The method of claim 2, further comprising operations performed by the memory controller including:
detecting that a stack frame has been popped off of the stack for the execution thread;
removing the frame-pointer corresponding to the stack frame that is detected to have been popped off of the stack from the end of the linked list; and
setting the frame-pointer that is now at the end of the linked list as the current frame-pointer.

4. The method of claim 1, further comprising operations performed by the memory controller including:
identifying a location in the stack containing a return address for a called function; and
preventing the location from being overwritten until the called function has properly returned to the return address.

5. The method of claim 4, wherein the location in the stack containing the return address for the called function is a memory location having an address in the system memory, further comprising operations performed by the memory controller including:
blocking the memory location from being overwritten;
observing a pattern comprising a burst of reads to the system memory;
detecting that an address for one of the reads in the burst of reads is the address for the memory location; and
unblocking the memory location to allow the memory location to be overwritten.

6. The method of claim 4, wherein the location in the stack containing the return address for the called function is a memory location having an address in the system memory, further comprising operations performed by the memory controller including:
blocking the memory location from being overwritten;
detecting, while the memory location is blocked, a write access having an address for the memory location;
determining the write access is unsafe; and
asserting an error to cause execution of the thread to halt.

7. The method of claim 1, wherein each memory write includes an address and data further comprising operations performed by the memory controller including:
storing a current frame-pointer for the stack, the current frame pointer having a data value that points to the location in a system memory physical address space of a current stack frame for the stack;
for each write in a burst of writes,
comparing the data in the write with the data value for the current frame-pointer; and
if the data matches the data value for the current frame-pointer, identifying the memory write as the frame-pointer for a new stack frame.

8. The method of claim 1, further comprising operations performed by the memory controller that prevent malicious code from overwriting page table entries in the system memory.

9. The method of claim 1, wherein the memory controller is integrated in a processor including a user-mode of execution and a privileged-mode of execution, each execution thread being executed by the processor being executed in one of the user-mode and privileged mode, the method further comprising operations performed by the memory controller including:
permitting page table entries to be written to the system memory via threads executing in privileged mode; and
preventing page table entries from being written to the system memory via threads executing in the user-mode.

10. The method of claim 1, further comprising operations performed by the memory controller including:
scanning memory pages in the system memory to identify if a memory page contains a page table structure;
for a memory page containing a page table structure including a plurality of page table entries; and
checking bit fields in the page table entries to determine whether a page table entry has been corrupted.

11. The method of claim 10, further comprising operations performed by the memory controller including:
detecting that a memory write will result in a change to a page table entry (PTE) mapping;
determining if a new page corresponding to the PTE mapping is legitimate; and
if the new page is determined to be legitimate, allowing the change to the PTE to proceed, otherwise preventing the change to the PTE.

12. An apparatus, configured to interface with system memory when installed in a computer system including system memory and multiple levels of caches implemented as a coherent memory architecture, comprising:
a memory controller including circuitry and logic configured to,
receive memory access requests comprising write and read accesses for writing to and reading from the system memory, each write and read access including an address in an address space for the system memory;
monitor patterns of accesses to the system memory;
identify, via observation of access patterns to the system memory, regions of memory to protect write access from malicious code;
detect, based on observed memory access patterns, a memory write access request to a region of memory to be protected from malicious code; and
detect whether the memory write access request is from malicious code, monitor bursts of writes to the system memory, the bursts of writes written to sequential addresses and corresponding to function calls from an execution thread executing on a processor core in the computer system; detect that a new stack from corresponding to a called function is added to a stack maintained in system memory for the execution thread, the new stack frame beginning with a frame-pointer; store a local current frame-pointer for the stack in the local memory or a register; update the local current frame pointer for the new stack from; and if it is, deny the write access request,
otherwise, allow the write access request to proceed.

13. The apparatus of claim 12, wherein the circuitry and logic in the memory controller is further configured to:
implement a linked list of frame-pointers in the local memory, the linked list including a first frame-pointer; and
when a new stack frame is detected to be pushed on the stack, append a frame-pointer for the new stack frame to the end of the linked list,
wherein each frame-pointer in the linked list except the first frame-pointer is a previous frame-pointer that points to the frame pointer preceding it in the linked list.

14. The apparatus of claim 13, wherein the circuitry and logic in the memory controller is further configured to:
detect that a stack frame has been popped off of the stack for the execution thread;
remove the frame-pointer corresponding to the stack frame that is detected to have been popped off of the stack from the end of the linked list; and
update the local current frame-pointer to the frame-pointer that is now at the end of the linked list.

15. The apparatus of claim 12, wherein the circuitry and logic in the memory controller is further configured to:
identify a location in the stack containing a return address for the called function; and
prevent data in system memory at an address corresponding to the location from being overwritten until execution of the called function has properly returned to the return address.

16. The apparatus of claim 15, wherein the location in the stack containing the return address for the called function is a memory location having an address in the system memory, and wherein the circuitry and logic in the memory controller is further configured to:
block the memory location from being overwritten;
observe an access pattern comprising a burst of reads to the system memory;
detect that an address for one of the reads in the burst of reads is the address for the memory location; and
unblock the memory location to allow the memory location to be overwritten.

17. The apparatus of claim 15, wherein the location in the stack containing the return address for the called function is a memory location having an address in the system memory, and wherein the circuitry and logic in the memory controller is further configured to:
block the memory location from being overwritten;
detect, while the memory location is blocked, a write access having an address for the memory location;
determine the write access is from malicious code; and
assert an error.

18. The apparatus of claim 12, wherein during operation of the computer system an operating system accesses and modifies a memory page table containing a plurality of page table entries and the circuitry and logic in the memory controller is further configured, exclusive of any input from the operating system, to prevent malicious code from overwriting page table entries.

19. The apparatus of claim 18, wherein the memory controller is integrated in a processor including a user-mode of execution and a privileged-mode of execution, each execution thread being executed by the processor being executed in one of the user-mode and privileged mode, and wherein the circuitry and logic in the memory controller is further configured to:
permit page table entries to be written to the system memory via threads executing in privileged mode; and
preventing page table entries from being written to the system memory via threads executing in the user-mode.

20. The apparatus of claim 12, wherein the memory controller includes at least one of local memory and a plurality of registers and the circuitry and logic in the memory controller is further configured to:

scan memory pages in the system memory to identify if a memory page contains a page table structure; and for a memory page containing a page table structure including a plurality of page table entries, checking bit fields in the page table entries to determine whether a page table entry has been corrupted.

21. A system comprising:

system memory having an address space;

a processor including,

- a plurality of processor cores, each including a local level 1 (L1) and level 2 (L2) cache and coupled to an interconnect;
- a last level cache, coupled to the interconnect;
- a memory controller, operatively coupled to the last level cache and including an interface coupled to system memory, including circuitry and logic configured to,
  - receive memory access requests comprising write and read accesses for writing to and reading from the system memory, each write and read access including an address in the system memory; monitor patterns of access to the system memory; identify, via observation of access patterns to the system memory, regions of memory to protect write access from malicious code; monitor bursts of writes to the system memory, the bursts of writes written to sequential addresses and corresponding to function calls from an execution thread executing on a processor core in the computer system; detect that a new stack from corresponding to a called function is added to a stack maintained in system memory for the execution thread, the new stack frame beginning with a frame-pointer; identify a location in the stack containing a return address for the called function; monitor patterns of accesses to the system memory;
  - identify, via observation of access patterns to the system memory, regions of memory to protect write access from malicious code;
  - detect, a memory write access request to the location in the stack containing the return address; and
  - detect whether the memory write access request is from malicious code, and if it is, deny the write access request,
  - otherwise, allow the write access request to proceed.

22. The system of claim 21, wherein the memory controller includes at least one of local memory and a plurality of registers and the circuitry and logic in the memory controller is further configured to prevent data in system memory at an address corresponding to the location from being overwritten until execution of the called function has properly returned to the return address, wherein proper return of the of the called function is detected by observing a burst of reads corresponding to the new stack frame being pushed off of the stack.

23. The system of claim 21, wherein during operation of the system an operating system accesses and modifies a memory page table containing a plurality of page table entries and the circuitry and logic in the memory controller is further configured, exclusive of any input from the operating system, to prevent malicious code from overwriting page table entries.

* * * * *